(12) United States Patent
Duns et al.

(10) Patent No.: US 9,436,659 B2
(45) Date of Patent: Sep. 6, 2016

(54) TRANSFERRING ANNOTATIONS BETWEEN DOCUMENTS DISPLAYED SIDE BY SIDE

(71) Applicants: Brad Duns, Los Angeles, CA (US); Laureen Sills, Malibu, CA (US); Kristin Wright, Sacramento, CA (US)

(72) Inventors: Brad Duns, Los Angeles, CA (US); Laureen Sills, Malibu, CA (US); Kristin Wright, Sacramento, CA (US)

(73) Assignee: 3RB LLC, Woodland Hills, CA (US)

( * ) Notice: Subject to any disclaimer, the term of this patent is extended or adjusted under 35 U.S.C. 154(b) by 120 days.

(21) Appl. No.: 14/309,855

(22) Filed: Jun. 19, 2014

(65) Prior Publication Data
US 2015/0370757 A1 Dec. 24, 2015

Related U.S. Application Data

(60) Provisional application No. 61/838,116, filed on Jun. 21, 2013, provisional application No. 61/905,079, filed on Nov. 15, 2013.

(51) Int. Cl.
*G06F 17/21* (2006.01)
*G06F 17/24* (2006.01)
*G06F 17/22* (2006.01)

(52) U.S. Cl.
CPC ......... *G06F 17/212* (2013.01); *G06F 17/2288* (2013.01); *G06F 17/241* (2013.01)

(58) Field of Classification Search
CPC .......................... G06F 17/2288; G06F 17/241
See application file for complete search history.

(56) References Cited

U.S. PATENT DOCUMENTS

| | | | | |
|---|---|---|---|---|
| 5,671,428 A * | 9/1997 | Muranaga | ............... | G06Q 10/10 715/201 |
| 6,275,223 B1 * | 8/2001 | Hughes | ................. | G06F 3/0483 715/751 |
| 6,438,566 B1 * | 8/2002 | Okuno | .............. | G06F 17/30011 707/E17.008 |
| 7,966,556 B1 | 6/2011 | Bourdev | | |
| 8,429,630 B2 | 4/2013 | Nickolov et al. | | |
| 8,509,808 B2 | 8/2013 | Krutt et al. | | |
| 8,607,167 B2 | 12/2013 | Matas et al. | | |
| 8,719,258 B2 | 5/2014 | Huang et al. | | |
| 8,738,637 B2 | 5/2014 | Shue et al. | | |
| 2003/0214528 A1 * | 11/2003 | Pierce | ................... | G06F 17/241 715/723 |
| 2005/0160356 A1 * | 7/2005 | Albornoz | .............. | G06F 17/241 715/229 |
| 2006/0150079 A1 * | 7/2006 | Albornoz | .............. | G06F 17/241 715/230 |
| 2012/0233543 A1 | 9/2012 | Vagell et al. | | |
| 2013/0054636 A1 * | 2/2013 | Tang | ..................... | G06F 17/241 707/769 |
| 2013/0262373 A1 * | 10/2013 | Rampson | ............... | G06Q 10/10 707/608 |
| 2014/0115436 A1 * | 4/2014 | Beaver | ................ | G06F 17/2288 715/229 |
| 2015/0339050 A1 * | 11/2015 | Vong | ..................... | H04L 65/403 345/173 |

* cited by examiner

*Primary Examiner* — Asher Kells
(74) *Attorney, Agent, or Firm* — Cislo & Thomas, LLP

(57) ABSTRACT

A system and method to view, edit, share, and organize files using software in the form of a computing application for a computing device, allowing a user to keep annotations directly on a document that may be transferred between updates. This allows multiple users to work on one project and share edits no matter where they are or what device they are using.

20 Claims, 26 Drawing Sheets

TRANSFERRING ANNOTATIONS BETWEEN DOCUMENTS DISPLAYED SIDE BY SIDE

CROSS-REFERENCE TO RELATED APPLICATION

This patent claims the benefit of U.S. Provisional Patent Application Ser. No. 61/838,116, entitled "Software System and Application for Organizing and Viewing Information," filed Jun. 21, 2013, and U.S. Provisional Patent Application Ser. No. 61/905,079, entitled "Software System and Application for Organizing and Viewing Information to Replicate a Three Ring Binder," filed Nov. 15, 2013, which applications are incorporated in their entirety here by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to a system and application that organizes files like a three ring binder and shares it among multiple parties.

BACKGROUND

Three ring binders have been used to organize files for a long time. However, there are many drawbacks to the use of three ring binders, including version control, delayed information, and limited accessibility among a plurality of users. They can be heavy, take a lot of time to sort through, and are tough to re-arrange for large projects. Thus, there is a need for a system that allows the organization capabilities of a three ring binder, but is much more efficient, dynamic, and accessible. Additionally, there is a need for a system that provides an intuitive interface that people will willingly accept. Therefore the present invention seeks to replace the old system in an efficient and comfortable manner.

SUMMARY

The present invention is directed to a system and method to view, edit, share, and organize files using software in the form of a computer application for a computing device. Embodiments allow multiple users to work on projects and documents while files are continually marked and updated by users on any number of devices.

This application has many uses in a number of industries. For example, in the entertainment industry, the system and application can be used to manage, share, and edit scripts among a large production team. However, this invention can apply to other industries where three ring binders are commonly used to store information that needs to be organized, re-organized, and displayed in an appropriate fashion. In the medical field, this system and application can be applied to monitoring patient information so all medical personnel stay up to date on proceedings and medications of patients. In the government sector, this could apply to budgets and billing, or to legislation that requires input from many sources. In stores, the system and application could be applied to inventory management. In education, the system and application could be applied to sharing notes on a digital handout. Particularly, this system is important where new material is constantly added by multiple sources and users need to be up-to-date on the latest information.

In some embodiments, files are hosted in a database on a server in a cloud computing environment accessible from the Internet. A user utilizing a software application on a computing device downloads files to the computing device. The user may view and annotate files through the software application. If an updated version of the file becomes available, the user is notified and can review the updated version and transfer annotations to the updated version of the file.

In some embodiments, there are varying levels of access to the files. In some embodiments, the server comprises a user database having user access privileges to different files, set of files, projects, clients, or other such criteria. User access privileges may be restricted by user, type of device, type of file, timeframe, or any other such criteria for limiting access. For example, an administrator could provide a user with access privileges to download, view and annotate documents of a project on up to one computing device. The user would not be able to edit a content layer of the document or push an update to other users.

In accordance with the present disclosure, users of the computing device would be able to review updated document pages before replacing older versions of documents with updated versions. In some embodiments, an annotation transfer view displays an old document page beside an updated document page, allowing the user to compare the documents and transfer and edit any annotations before confirming the replacement a document page.

These and other features, aspects, and advantages of the present invention will be apparent to those of ordinary skill in the art by reference to the following detailed description and the accompanying drawings.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

It will be understood that, although the terms first, second, etc. may be used herein to describe various elements, these elements should not be limited by these terms. These terms are only used to distinguish one element from another. For example, a first level of access could be termed a second level of access, and, similarly, a second level of access could be termed a first level of access, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with an embodiment of the present disclosure, multiple users can concurrently download and view a document on multiple computing devices while making edits and annotations to the document. Select users may update the document and push the updates to other users. Users receiving an updated document may review pages of the new updated version and transfer any annotations from an older version to the updated version.

Figure 1:
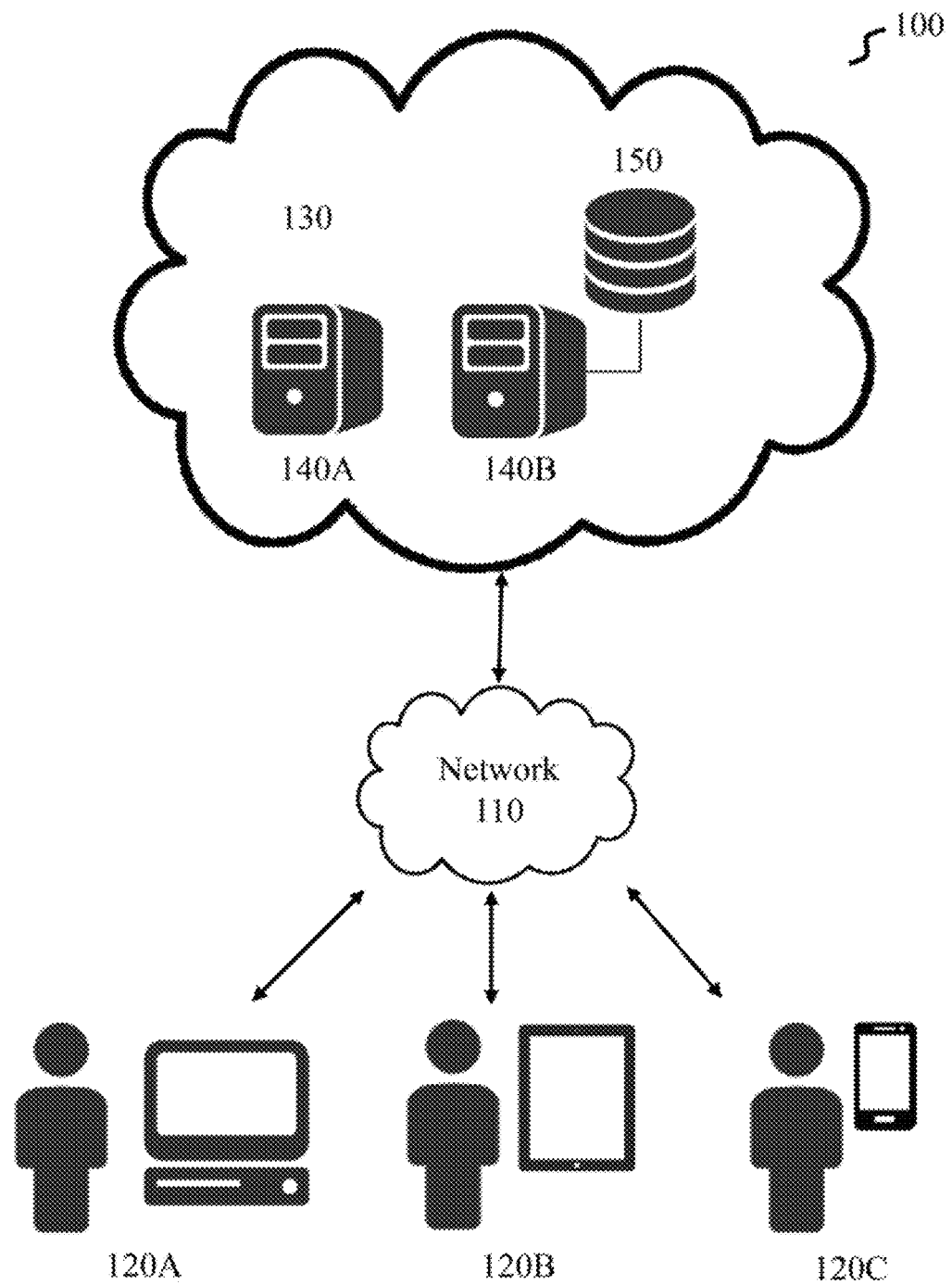
FIG. 1 is a diagram of an exemplary environment in which the present disclosure may be implemented.

The collective environment for viewing and editing the document can be provided and accessed in a variety of forms. FIG. 1 illustrates an exemplary environment 100 in which the present disclosure may be implemented. In some embodiments, the environment 100 in which the document is accessible to a plurality of users on a plurality of computing devices can be a cloud computing environment. In some embodiments, a software system for organizing and viewing information can be provided as a peer-to-peer application on a plurality of computing devices that can communicate with a server and/or each other via a network.

As illustrated in FIG. 1, a user at a computing device, such as a desktop computer 120A, a tablet computer 120B, or a cellular telephone 120C, accesses the computing environment 130 via a network 110. Within the computing environment 130, servers 140A, 140B can provide multiple services. For example, servers 140A, 140B can provide access to websites, user databases 150, file databases 150, and interfaces for different types of applications and devices. The server or multiple servers 140A, 140B can include virtual computing and/or storage resources. For example, an embodiment of the computing environment 130 could use a two-tier architecture using Amazon Elastic Compute Cloud (EC2) server instances and an associated virtual database 150. A database 150 holding information regarding users, clients, projects, and/or documents could be accessible from computing devices via a network 110, such as the Internet or a local area network. Examples of user information include the user's name, picture, email, password, screen name, phone number, devices, profile, past work, current projects, and/or user access privileges. Examples of project information include project title, picture, description, creation date, update information, whether the project is active/inactive, available files/documents, and/or users involved. This data would preferentially be protected by security, wherein access requires users to provide the necessary security credentials.

In some embodiments, the server cloud may comprise a website and an application server for communication with client devices. For example, the website may be accessed by a user via a browser on a client computer, and may provide logistical user registration, profile management, project creation and payment options, and other such features. The application server, such as a Node.js App Server, communicates with all client side applications, such as an application on a smartphone, a tablet computer or a desktop computer. In these embodiments, the Node.js App Server could be configured to support user management centric call flows, including creating and managing user accounts and projects globally, verifying user access information on login from a computing device, managing project information to send to the user based on login information and the type of device, and/or sending and receiving document information. The Node.js App Server may store high level summary information about each user's client/project in order to populate information on a device's first login screen before entering into a specific project's detail view. The App Server may also provide APIs to create/update/retrieve/collate specific projects, APIs to store/retrieve user level annotations, and notification capabilities for project updates.

In some embodiments, users may have different access privileges regarding documents and projects. In preferred embodiments, a project is an environment on the system that may be shared amongst multiple users on multiple computing devices so that users with access privileges to the project have access to the same files stored within that environment. In some embodiments, access privileges are granted based on predefined levels or tiers of users. For example, a user with first level access privileges may be defined as an Administrator with access privileges to all functions, including updating the documents stored in the server and changing other user's access privileges. A user with second level access privileges may be defined as a Reader with access privileges to view documents and make local annotations. In other embodiments, a plurality of functions may be available and set for individual users. For example, functions may include viewing project data, download/viewing documents, annotating documents, sharing documents and/or annotations, uploading revised documents, setting user access privileges, terminating a project, messaging other users in a project, and the like. The user access privileges of a user in such an embodiment may toggled on or off for each individual function.

Figure 2:
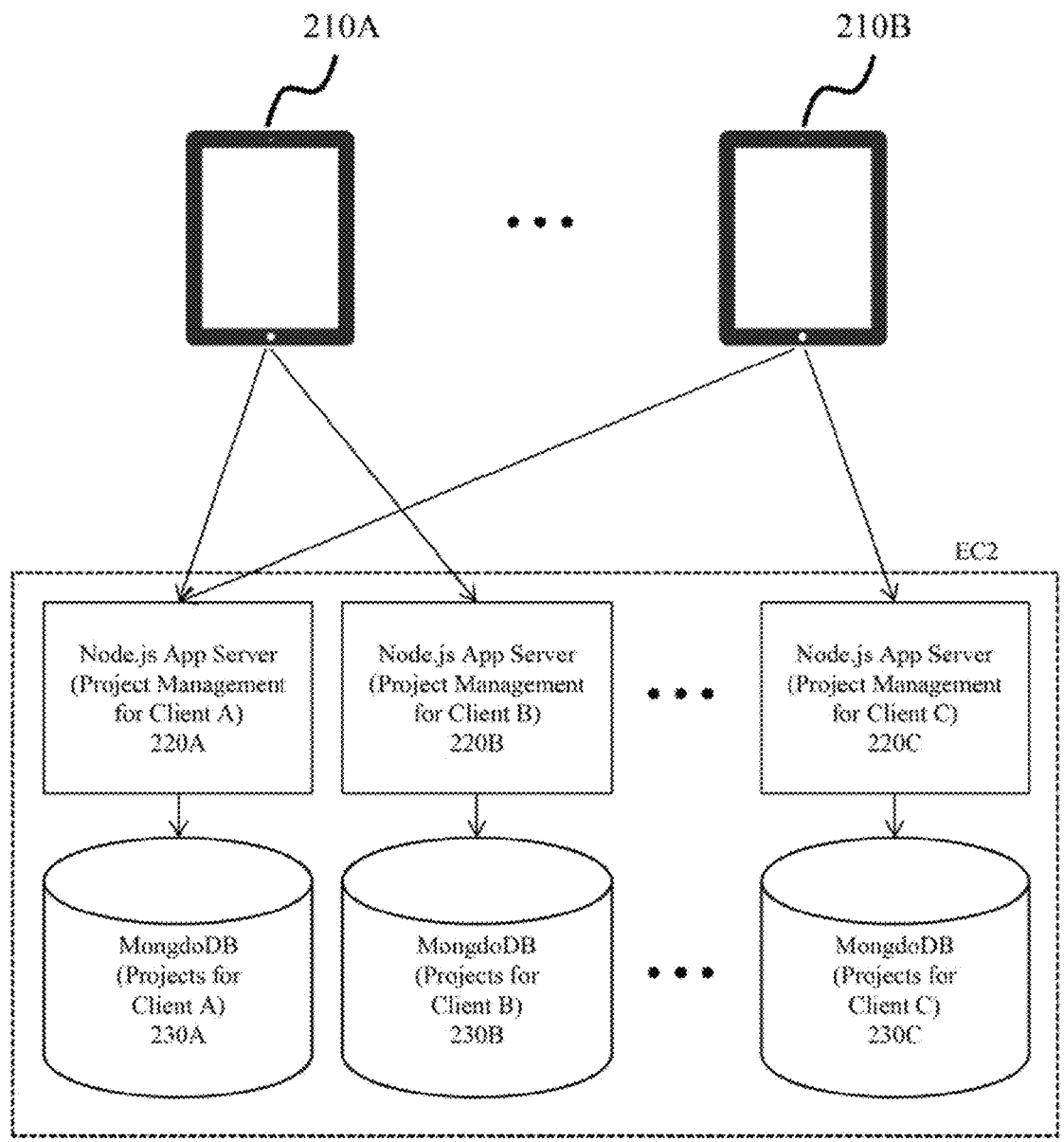
FIG. 2 shows devices with differing access privileges to different projects in accordance with an embodiment of the present disclosure.

In some embodiments, as shown in FIG. 2, each project has its own set of access privileges for different users. Users may have first level access privileges on some projects, second level privileges on other projects, and no access privileges on additional projects. For example, User X may have first level access privileges to Project A and second level access privileges to Project B, while User Y may have second level access privileges to Project A and Project C. Some users may have limited access privileges to only view documents and personal notes and annotations that are not shared among other user devices or the cloud. Some users may have access to modifying the document on a computing device, sending it to the server and distributing it to other users with access privileges to the project.

In exemplary embodiments, a user who creates a project has an ability to define the user access privileges of other users and define the termination conditions of a project. Termination of a project may be set on creation, such as by putting a time and date for a project to end user access privileges, or manually terminate the project at any point. In some embodiments, project termination may be provided to other users.

Figure 3:
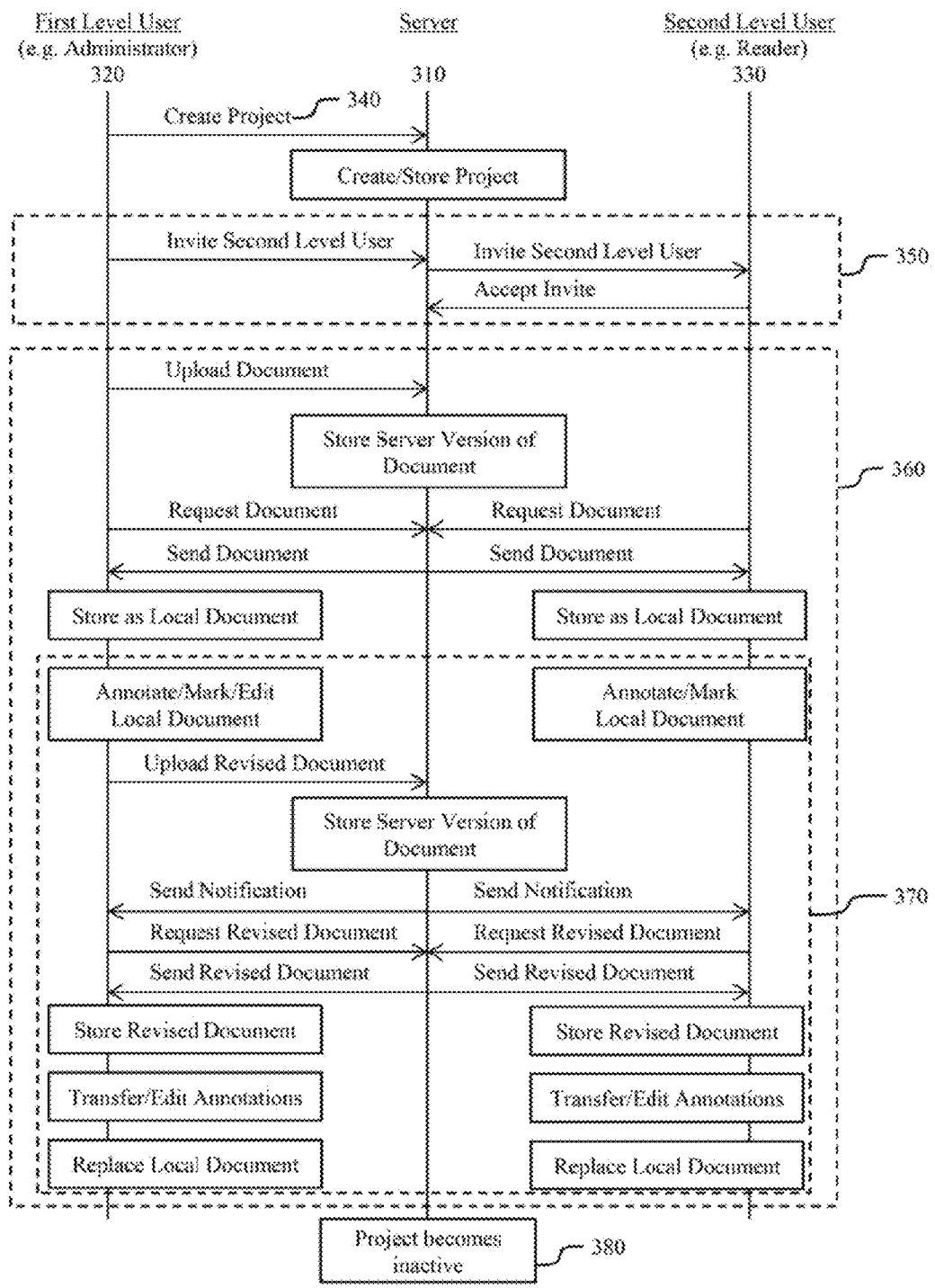
FIG. 3 is a call diagram of a system comprising a first level user, a second level user, and a server in accordance with an embodiment of the present disclosure.

FIG. 3 is a call diagram of a system comprising a first level user, a second level user, and a server in accordance with an embodiment of the present disclosure. In this embodiment, a first level user, labeled as an Administrator 320, and a second level user, labelled as a Reader 330, interact with a server 310. In this embodiment, the server 310 hosts a global user database for user login and access level information and creates a server instance, such as an Amazon EC2 server instance, for each project.

In step 340, a user before becoming an Administrator 320 for a project accesses the server 310 in order to create the project. In some embodiments, a user accesses the server 310 using a computer browser to access a website hosted on the server 310. In other embodiments, a user accesses the server 310 through a software application on a computing device. In some embodiments, user registration in a global database is a requirement in order to create a project. In creating a project, the system prompts the user to enter information necessary to create the project. For example, the system may require or request a title, a period of time for the project to remain active, payment, user access information, a description of the project, documents to upload to the project, and other such information. This information may be entered when creating the project and/or may be updated at a later point in time. The server may generate various settings and documents based on the information provided. In some embodiments, once a project is created, the user who created the project is automatically set as an Administrator with first level access privileges to the project.

Managing user access privileges may be done by users having the necessary access privileges. Users may be added, removed or have their level of access privileges changed by a user having user management access privileges. In an exemplary embodiment, only Administrators have user management access privileges, and are able to invite first and second level users and remove/edit access privileges of users with second level access privileges from the project. Readers would not have access privileges to manage the project's user access privileges. In the example embodiment, the Administrator invites a user to join a project as a Reader in step 350. Once a user accepts an invitation as a Reader or Administrator, that user then has access privileges to view and download documents that are part of the project. In some embodiments, users may be part of groups in social networks, and may be invited as a team to projects.

Project documents stored on the server 310 may be made available to users with access privileges to the project. In the example embodiment, all users, including all Administrators and Readers, have access privileges to view and download documents to computing devices. However, only Administrators have access privileges to upload or update documents. In the example embodiment, Administrators manage documents in step 360, which includes uploading documents, revising documents, updating documents, and pushing revised documents to other users.

Managing documents may involve managing different versions of the documents. For example, a server version of a document can start at version 1.0 and increase with every update. In some embodiments, instead of having an incrementing version number for each document, a project may have a project version number in order to track changes. In some embodiments, the server may save each version individually and allow access to all versions of a document. In some embodiments, only the latest version of the document is available to users. In some embodiments, an Administrator may force users to update their documents. A software embodiment of the present invention could keep track of the version of all relevant files in order to ensure files are up to date. In some embodiments, the server 310 automatically notifies all users when a document has been updated, such as through the software application or attached communication methods such as email or text messages. In some embodiments, an Administrator pushes the document to the user of the project. In some embodiments, a user manually queries to check for updates. The updating process 370 is described in more detail further below in the detailed description.

In an exemplary embodiment, a user would use a software application on a mobile device or tablet computer in order to access documents on the server. The software application may be operable to access the server, transmit user credentials, download and display projects and documents, annotate the document, and update the document. Depending on the user's access privileges to a project, the application would enable or disable various functions in managing the project.

In some embodiments of a software application, the software provides tools for a user to mark or change the documents saved locally in the software application. For instance, a user may annotate the document using annotation features, including adding text, drawings, shapes, freeform pen, cues/graphics, highlights, tags, bookmarks, and other such features. These features may be customizable, such as by color, fill color, background color, font, size, alignment, bold, underline, italics, and opacity. Tags may include pages, acts, items, slugs, people, teams, breaks, and other such information that a user may wish to mark and monitor.

In some embodiments, each document comprises a content layer and a note layer. The content layer comprises the base PDF document, including text, pictures, formatting, and the like. The note layer holds the annotations of a user created on the software application. The content layer and the note layer may be edited independently. This is useful in ensuring that edits on one layer do not affect edits on another layer. In some embodiments, different layers are stored in a single file. In other embodiments, the content layer and the note layer are separate files that are called to be viewed together as a single document.

In further embodiments, the document may comprise one content layer and multiple note layers, wherein a user viewing the layers chooses display options for each layer. These display options may include whether or not the layer is displayed, in which order the layers are displayed, style choices for the annotations, or the like. For example, in certain embodiments wherein a plurality of Readers annotate a single document, each Reader creates a unique note layer for the document and uploads it to the server. These note layers and the content layer of the document are then downloaded by an Administrator, who can choose to display all note layers over the content layer. Each note layer is tagged with the user who created it, and its display styles may be chosen by the Administrator. This would be very useful for editors when editing and updating documents to know what areas to focus on and what to incorporate, as well as keeping track of which user created each note.

In some embodiments, the server version of a document comprises a content layer with an empty note layer. An Administrator may upload annotations to the note layer of the server version of a document. In some embodiments, a document may comprise multiple note layers for each user of a project. In such embodiments, each user may be assigned a note style or tag to differentiate the note layers by user. In some embodiments, users may have limited access to different note layers. In an exemplary embodiment, a user may download the content layer and the multiple note layers of a document, incorporate the note layers of the document into the content layer, and then upload the updated content layer to the server as a revised document.

Figure 4A:
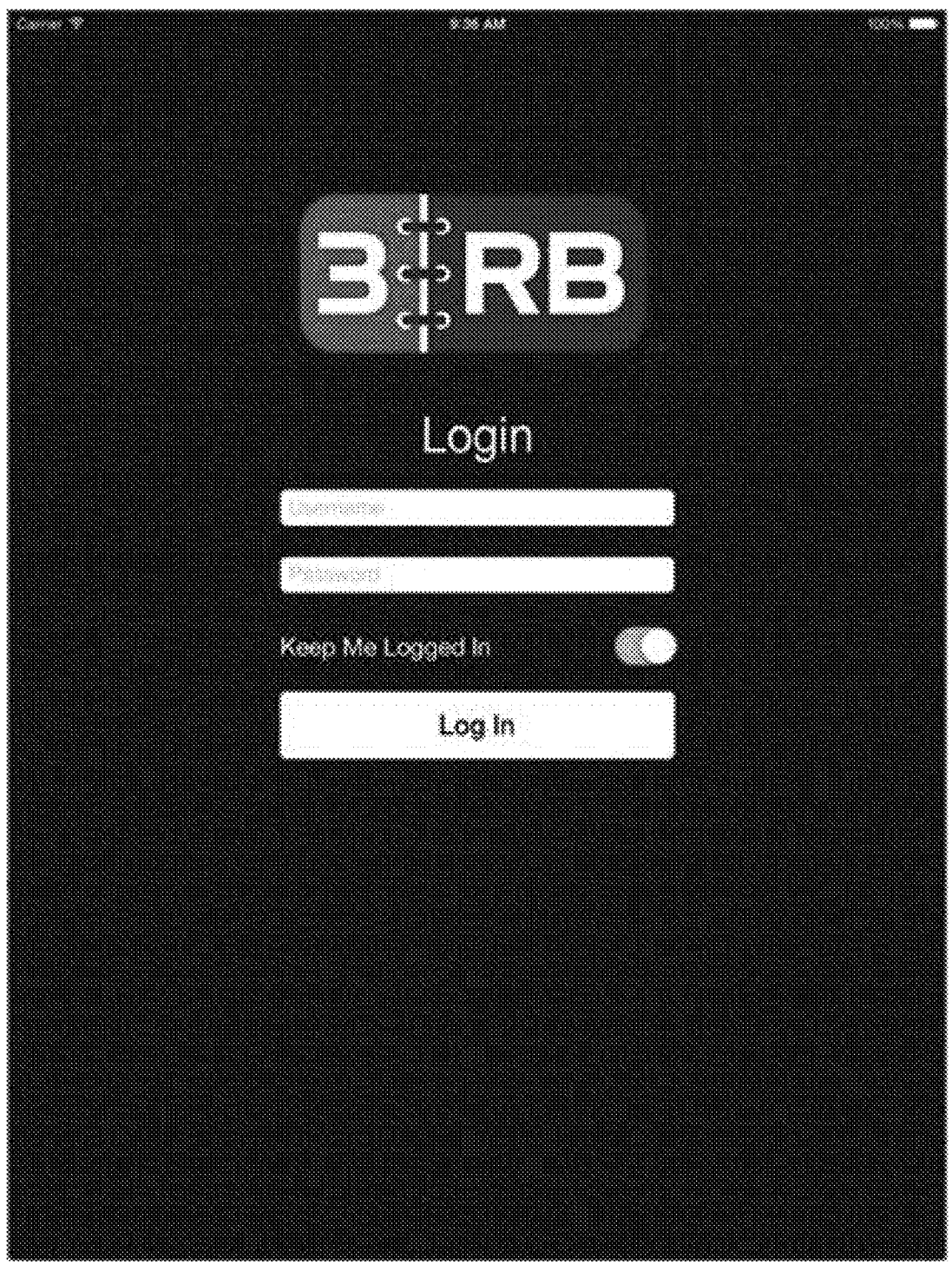
FIG. 4A shows a login screen of a software application in accordance with an embodiment of the present disclosure.

FIG. 4A shows a graphical user interface (GUI) displaying a login screen to a software application in order to verify user access privileges in accordance with an embodiment of the present disclosure. A username and password lock verifies a user's access privileges to access documents and projects on the server. In some embodiments, a feature allows a user to save login information or to always stay logged in for convenience.

Figure 4B:
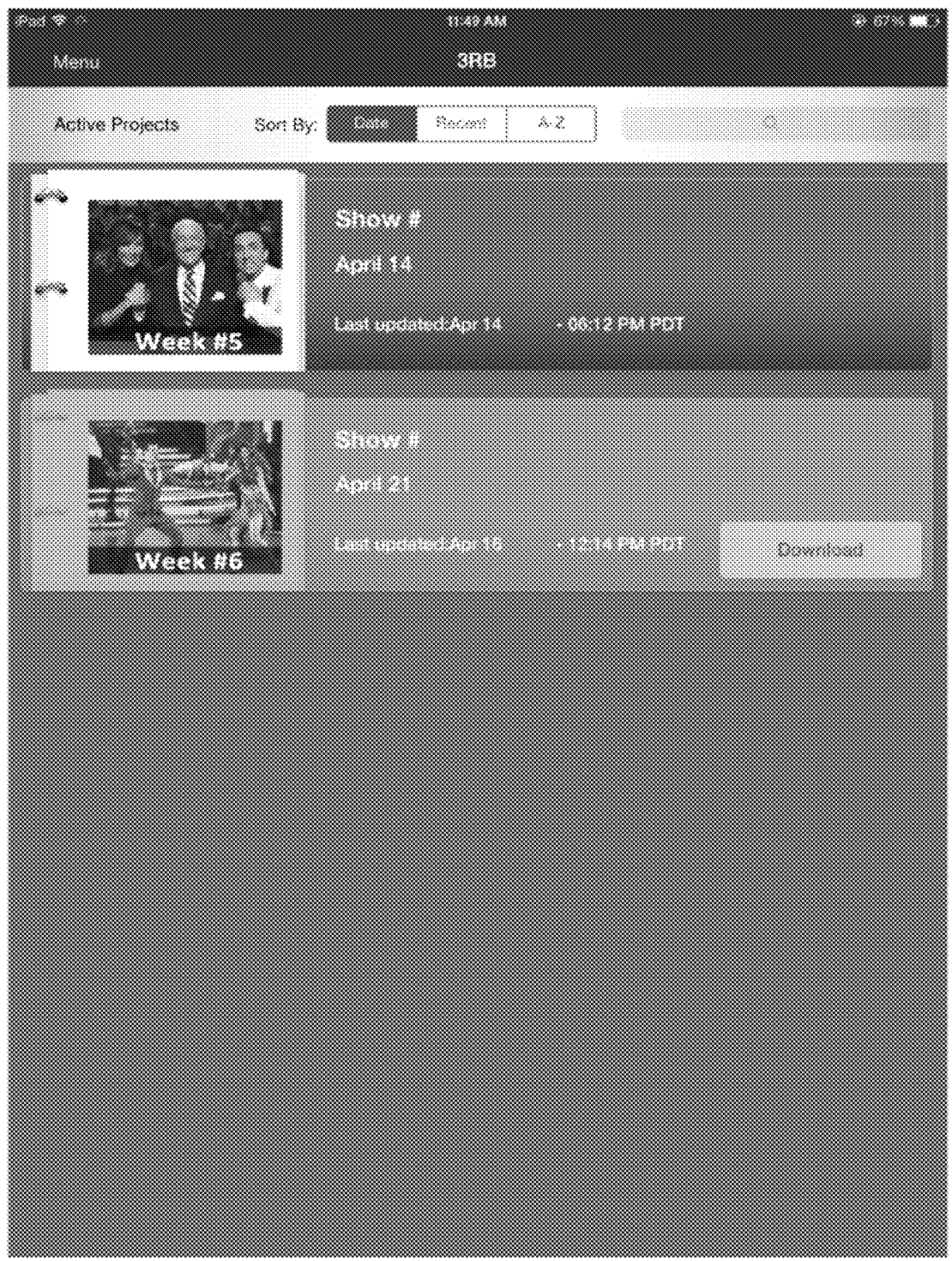
FIG. 4B shows a project list page of a software application in accordance with an embodiment of the present disclosure.

FIG. 4B shows a Project List page of a software embodiment in accordance with the present disclosure, wherein the projects in which a user has access privileges are displayed. In this example, a user has access to two active projects for two episodes of a TV show. Projects that have already been de-activated can be shown by selecting the button in the top left hand corner labeled "Active Projects" and selecting de-activated projects. De-activated projects may have restricted access or no access to users who had access privileges while it was still active. Projects may be displayed or sorted based on a user's criteria, such as chronologically, alphabetically, numerically, most recently accessed, or the like. Projects may also be searched, such as by keywords or tags. The display of each project may show as many or as few details as needed or wanted. As pictured, each project is shown with a title, the last date the Project was updated, and a button to download all files in the Project. An additional image is displayed that is representative of the project. The example image is framed in a 2 ring binder to maintain the theme of the software replacing the features of a physical binder.

Figure 4C:
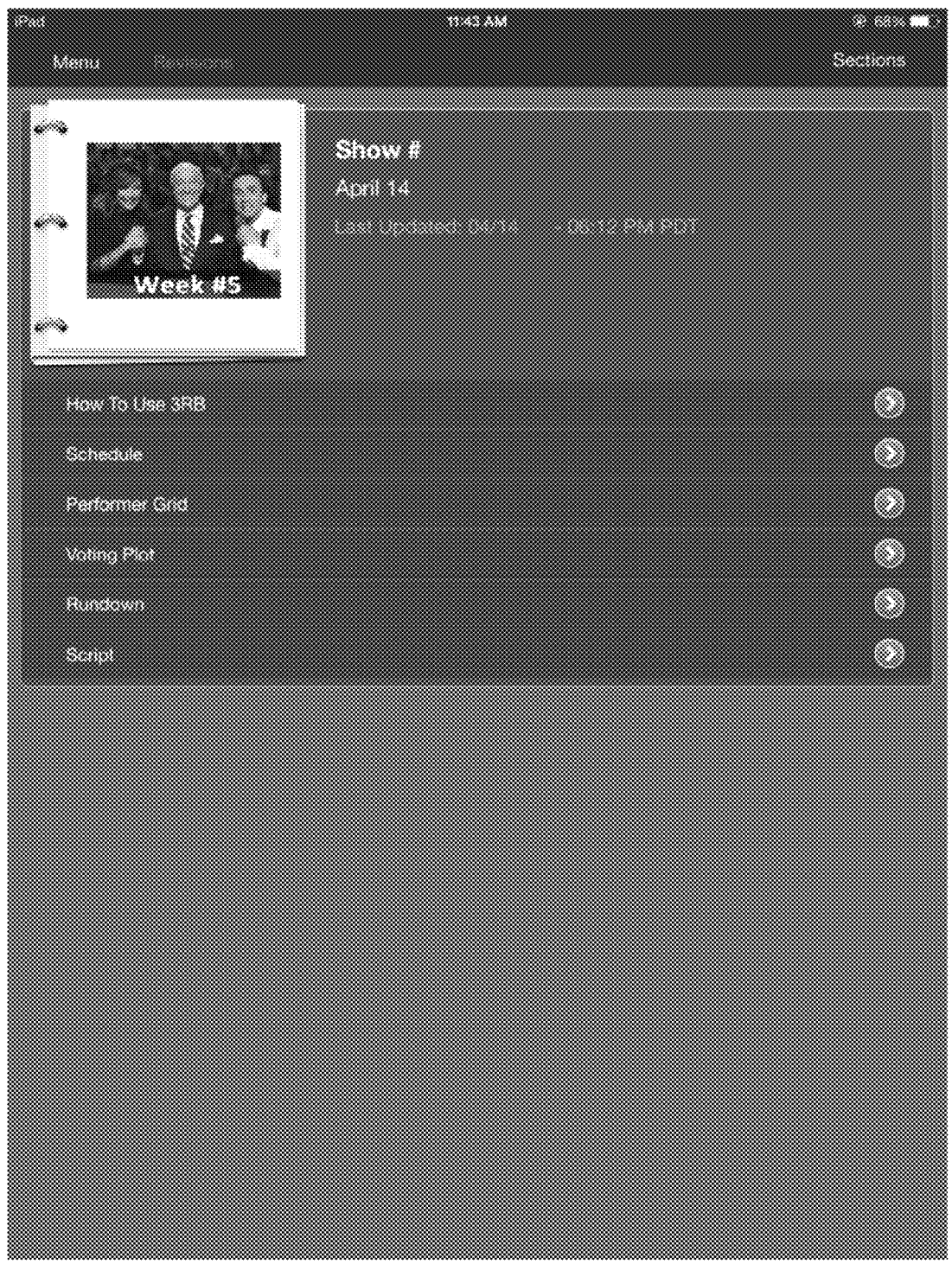
FIG. 4C shows a project page of a software application in accordance with an embodiment of the present disclosure.

FIG. 4C shows a Project page of a software embodiment of the present invention. As shown, the project page may display an image representative of the project, along with identifying information, such as the title, date for the show to be aired, the date of the last update, a list of all documents that are part of the Project, and other information of which a user of the Project may wish to access. In this embodiment, the representative picture is framed in a three-ringed binder, keeping with the theme of a software program replacing a physical three-ringed binder. A user taps on a document in order to view the document in the Document Reader.

Figure 4D:
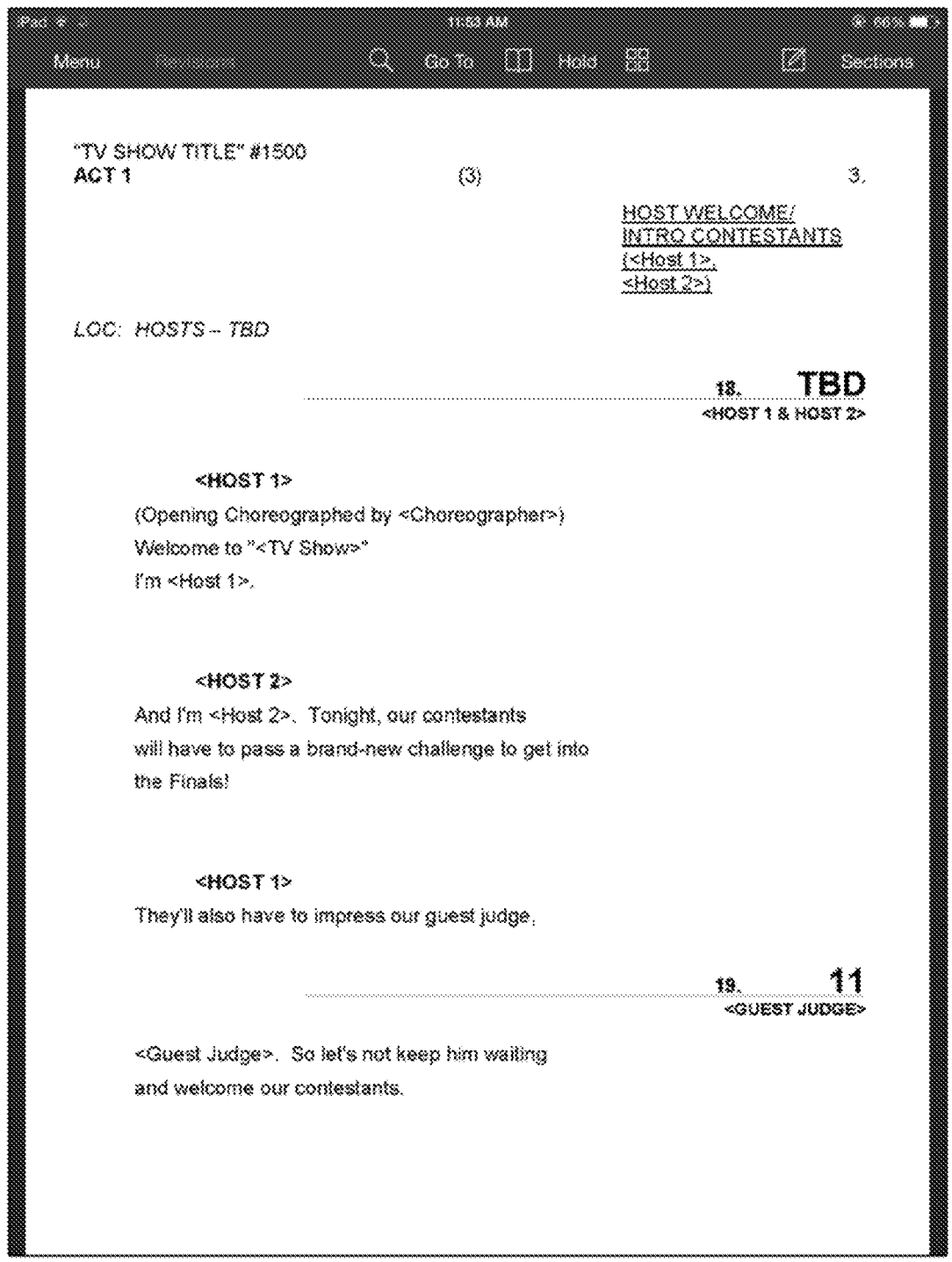
FIG. 4D shows a document reader of a software application in accordance with an embodiment of the present disclosure.

FIG. 4D shows a sample script viewed in the Document Reader. This document may be annotated by various members of the production team, and edited and updated by select users such as a director in charge of the production team. The document shown herein is of the PDF format, but other file formats may also be used. For example, text documents, spreadsheets, maps, pictures, or any other type of document that a user would wish to display on a computing device. The document may also include features not available in a typical paper-based three-ringed binder, such as links to other pages or websites, music, video, and other such added functionality.

In additional to the features a document may have embedded, software embodiments may also include a set of tools for navigation and annotating/marking the document. As shown on the top framework of the GUI, the software embodiment provides various functions that make a digital three ring binder much more useful and convenient than a physical three ring binder.

The functions shown in this embodiment include, but are not limited to, Menu, Revision, search, Go To, Document List, Hold, Multiple Page View, Email, Annotation, and Sections. The Menu Button as shown herein allows a user to switch back to the Projects List Screen, view/edit a user's profile, and allows a user to log out. The Revision icon as shown herein notifies a user when an update to a Project or document is available, downloads the available update, and navigates the user to the Revision Menu, as explained further below. The Search Button allows a user to search the contents of the documents. The GoTo Button allows a user to jump to a specific item or page number. In some embodiments, a user clicking the GoTo Button is shown a virtual keyboard in which the user types in a desired item, and the software embodiment automatically lists matching pages or items as the user types. The Bookmarks Button allows a user to add bookmarks to a document. These bookmarks are used to mark certain pages of documents in order to quickly come back to those pages. For example, in the multiple page view of the document, a user would be able to choose an option to view only bookmarked pages. This allows a user to see all the pages the user wishes to return to. The Hold Button is used as a link to page in the document. A user can tap the Hold Button once to save a place and then no matter where the user navigates, the user taps the Hold button to jump back to the saved page. The Grid View is used to view multiple pages of a document for quick navigation. In some embodiments, the grid view also shows a user's notes. The Email Button allows a user to email a copy of a document. This feature may be useful to transfer the document to another person, especially one who may not have access to the software embodiment of the system. This is also useful to send a copy of a document as a backup. The Annotate Button allows a separate set of Annotation tools to appear that allows a user to mark/edit the document. These annotations may be transferred when a document is updated. The Sections Button allows a user to navigate to different documents within a single Project.

Figure 4E:
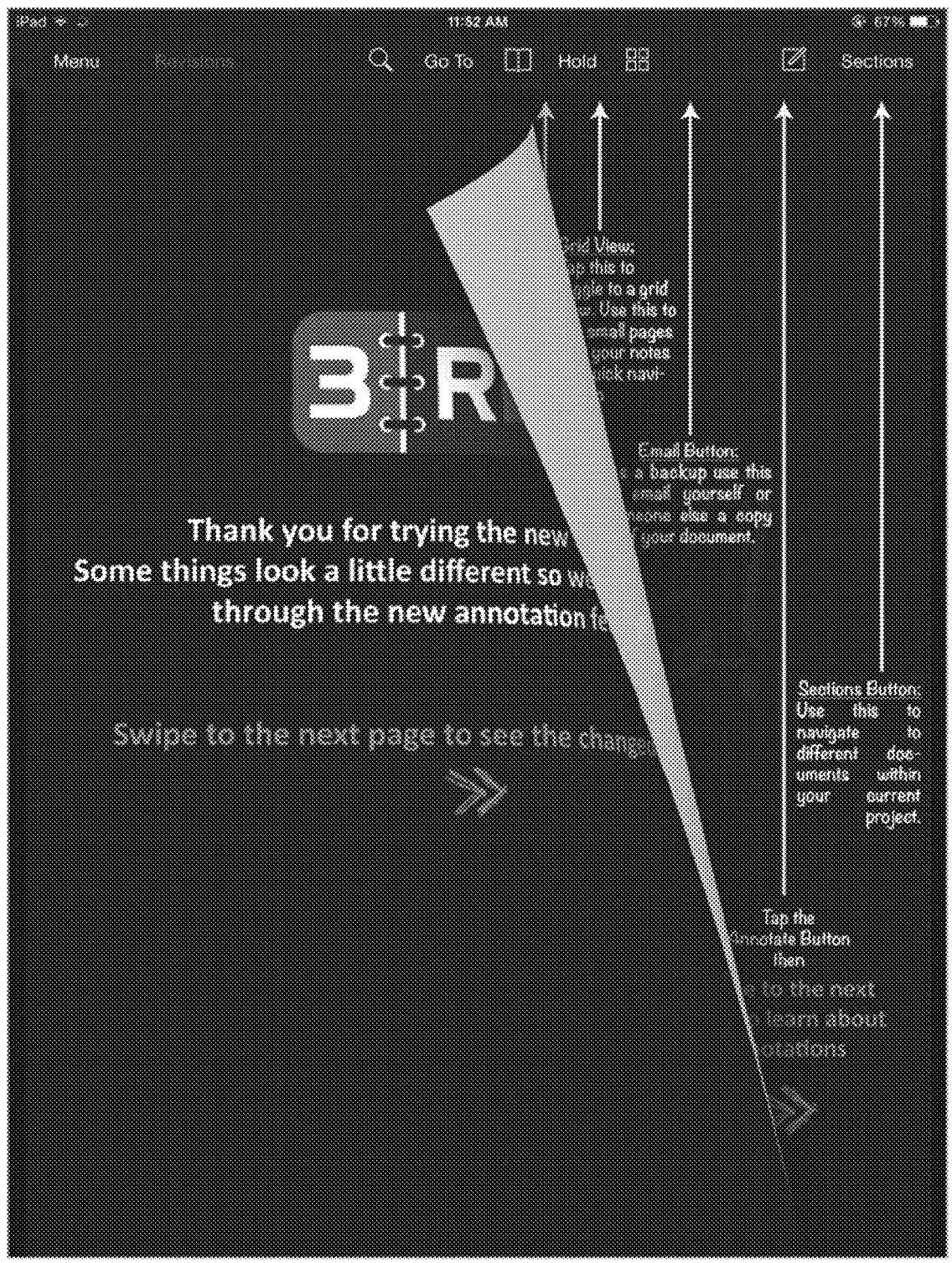
FIG. 4E shows an example of a page flip function of a software application in accordance with an embodiment of the present disclosure.
Figure 4F:
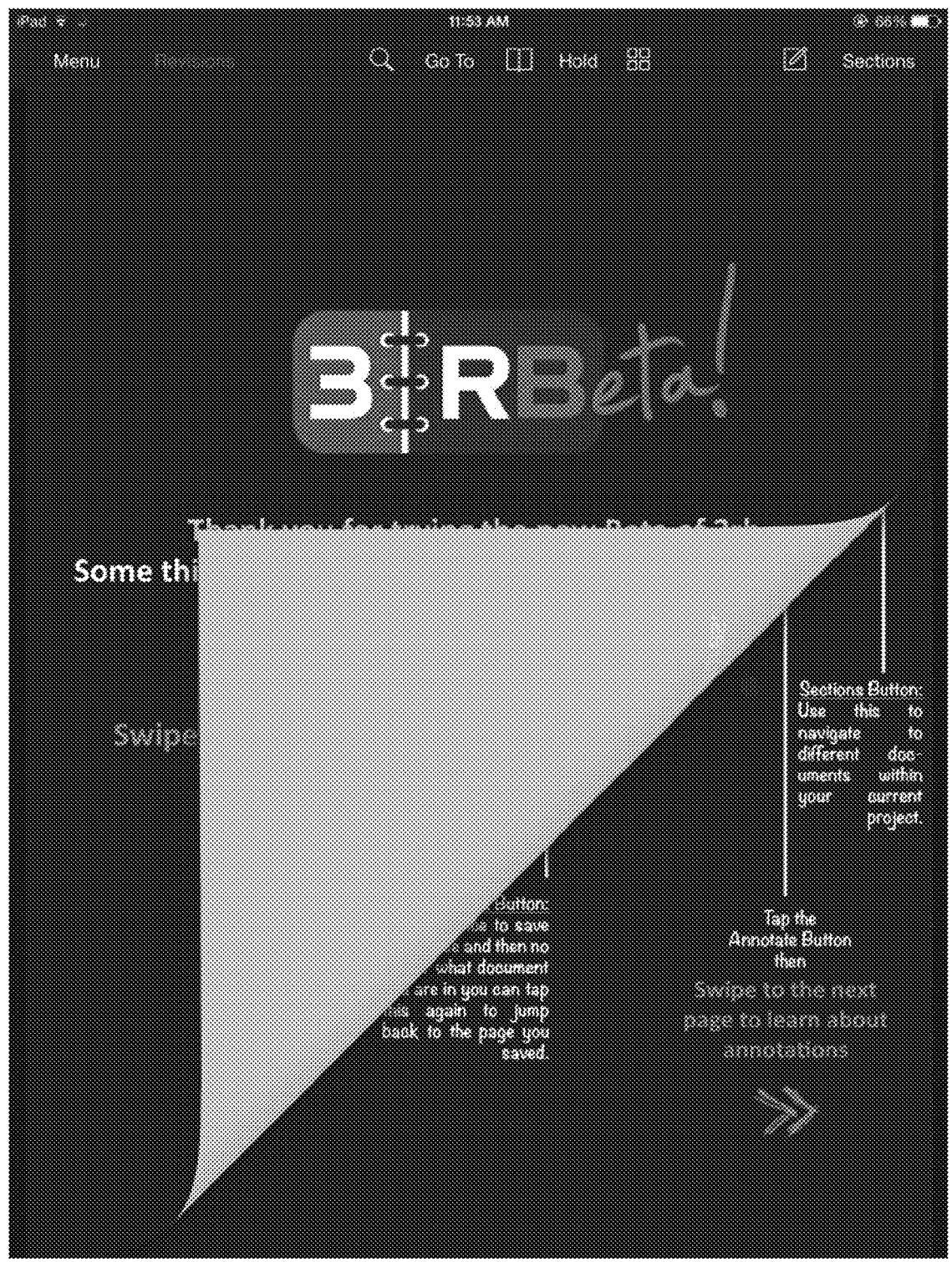
FIG. 4F shows another example of a page flip function of a software application in accordance with an embodiment of the present disclosure.

FIGS. 4E-4F demonstrate a feature designed to make the transition from a physical three-ringed binder to a digital three-ringed binder more fluid. In some embodiments, navigation of a document may involve flipping over a page to get to the next page. By touching the right side of a touchscreen and dragging it to the left, the digital page of the document may act like a physical page by displaying a representation of the page bending to reveal the next page in the document. The location of the page initially touched and the direction the user moves determines how the page interacts with the user. For example, as shown in FIG. 4E, a user touches the top right corner of the screen and drags the page to the left, revealing the right side of the page. In FIG. 4F, a user touches the bottom right corner of the screen and drags the page diagonally up and left. This causes the bottom right portion of the next page to be revealed. This unique embodiment allows a user to view a section of a first page and a section of a second page without fully transitioning from page to page. This navigational feature maintains the theme of simulating a digital three ring binder.

Figure 4G:
FIG. 4G shows a grid view of a document in a software application in accordance with an embodiment of the present disclosure.
Figure 4H:
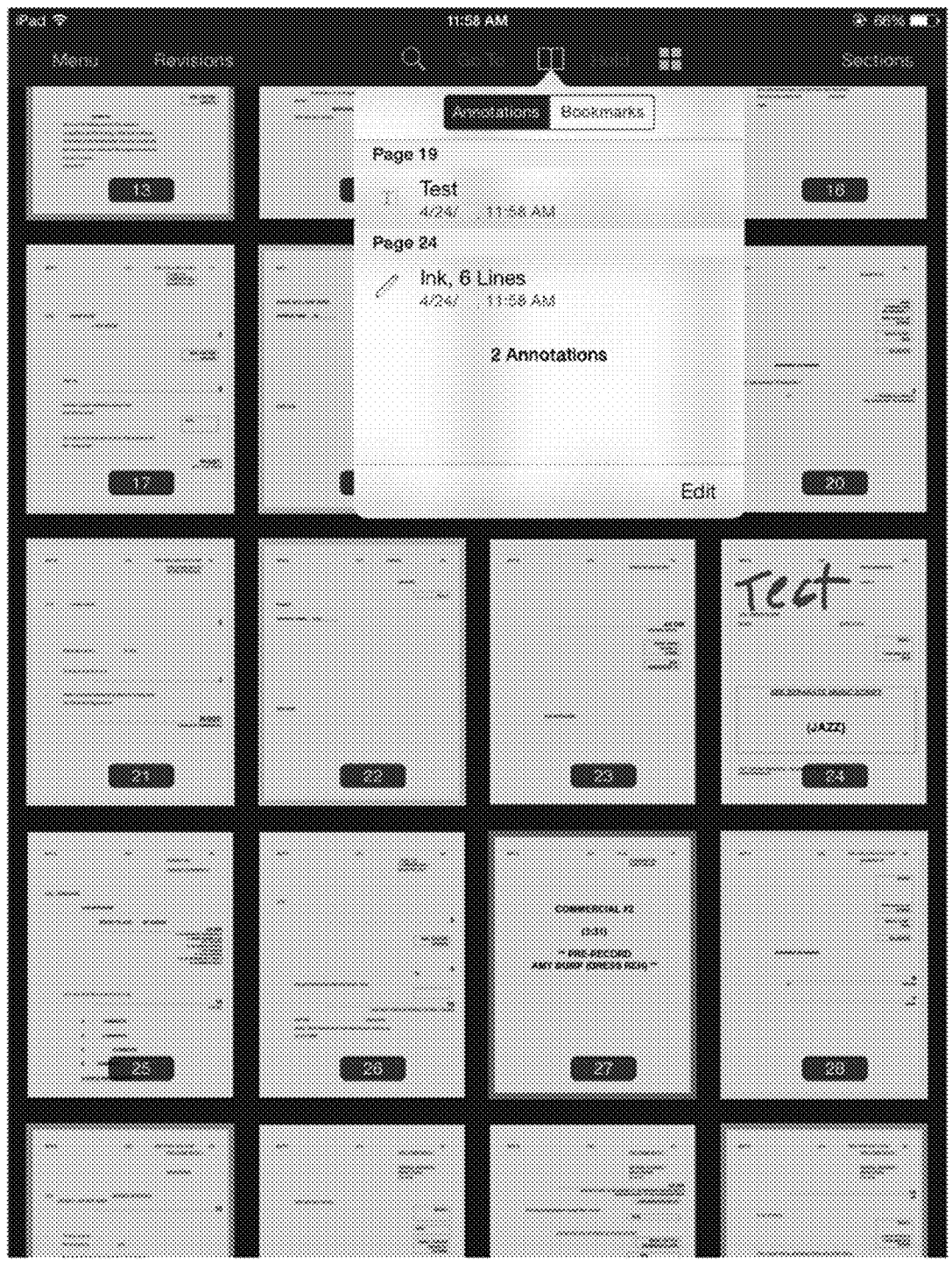
FIG. 4H shows an annotation list of a software application in accordance with an embodiment of the present disclosure.
Figure 4I:
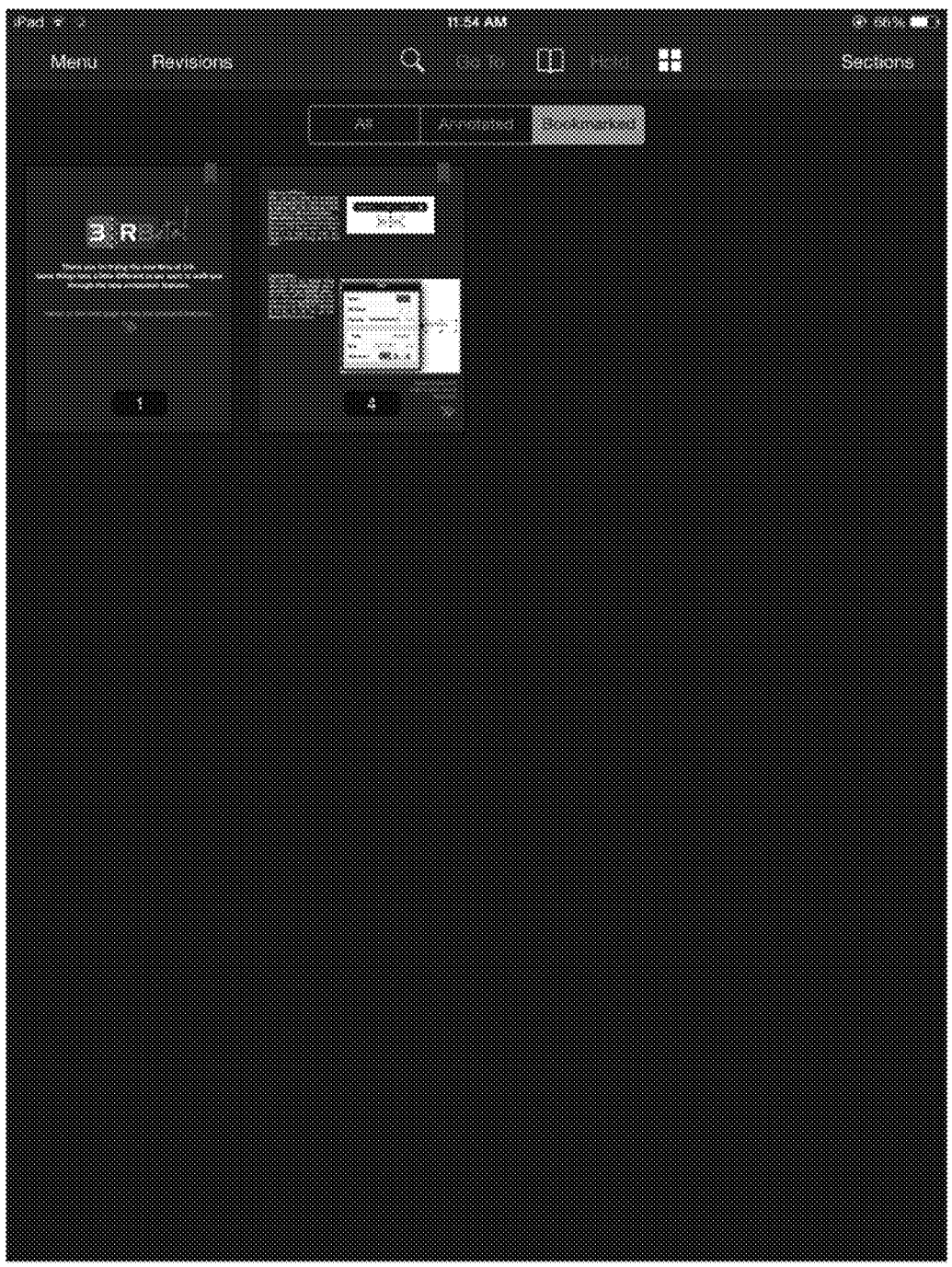
FIG. 4I shows a bookmark list of a software application in accordance with an embodiment of the present disclosure.

FIGS. 4G-4I show an embodiment of the Grid View. In this view, multiple pages are shown at the same time in a grid. This view may include additional indicators to notify the user of specific properties of a page. For example, a page may be highlighted a first color to signify that the page has annotations, a second color to signify that the page has been bookmarked, a third color if the page has been revised in the last update, and any number or combination of colors for any other property a user may wish to indicate. The Grid View may also have additional features, such as displayed in the menu bar. For example, FIG. 4H demonstrates an annotation list, displaying the annotations in a document, their pages numbers, and their properties. A user may be able to click on an annotation to view that page of the document. In another example, FIG. 4I demonstrates a bookmark list, which only displays pages that have been bookmarked by the user for ease of navigation.

FIGS. 5A-5D demonstrate various Annotation Tools that may be available to a user using a software embodiment of the present disclosure. These tools act similar to how a user would use a pen in a physical three-ringed binder in order to mark up a document. As shown in the top menu bar, annotations tools may include, but are not limited to, Highlight Text, Textbox Button, Freeform Drawing, Shape Tool, Marquee Tool, Cue Tray, Styles, Undo, Redo, Tag, and Bookmark.

Figure 5A:
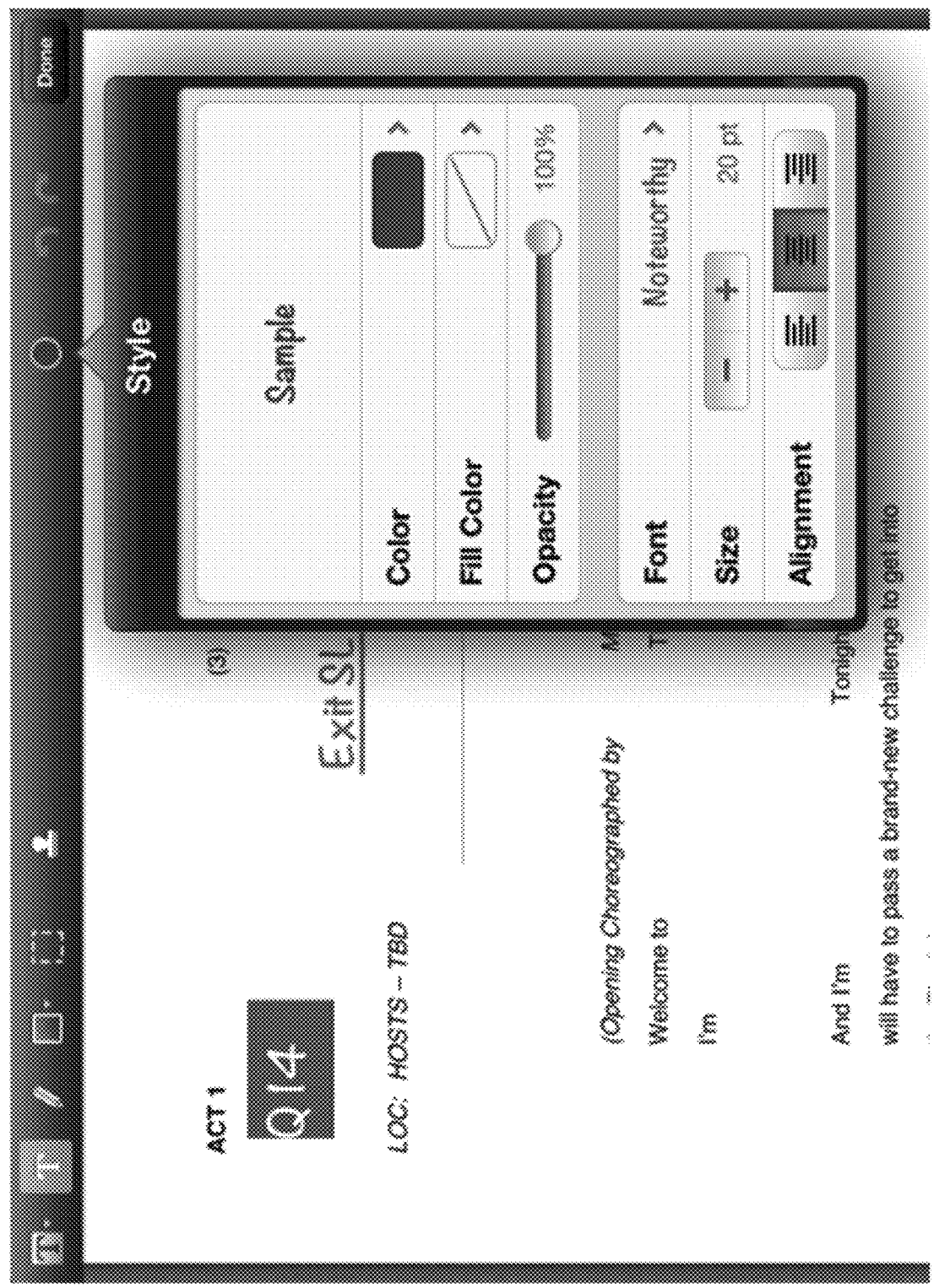
FIG. 5A shows a style tool for annotations in accordance with an embodiment of the present disclosure.

The Style Tool, as shown in FIG. 5A, may be used with various annotation tools to customize the style of the annotation, such as in color, font, size, pattern, background, or other such styles. Each annotation tool may have customizable styles not available for other annotation tools. The Style Tool may also show a preview of what the style looks like when applied. Styles may be customized before or after the annotation is created.

The Highlight Text tool may be used to select text in the document to be highlighted. A user may click this button and then click and drag a finger over text in the document. Since document text may differ when a document is updated, highlights may not be transferred in some embodiments. In this situation, a user may need to manually highlight text in Annotation Transfer View.

Figure 5B:
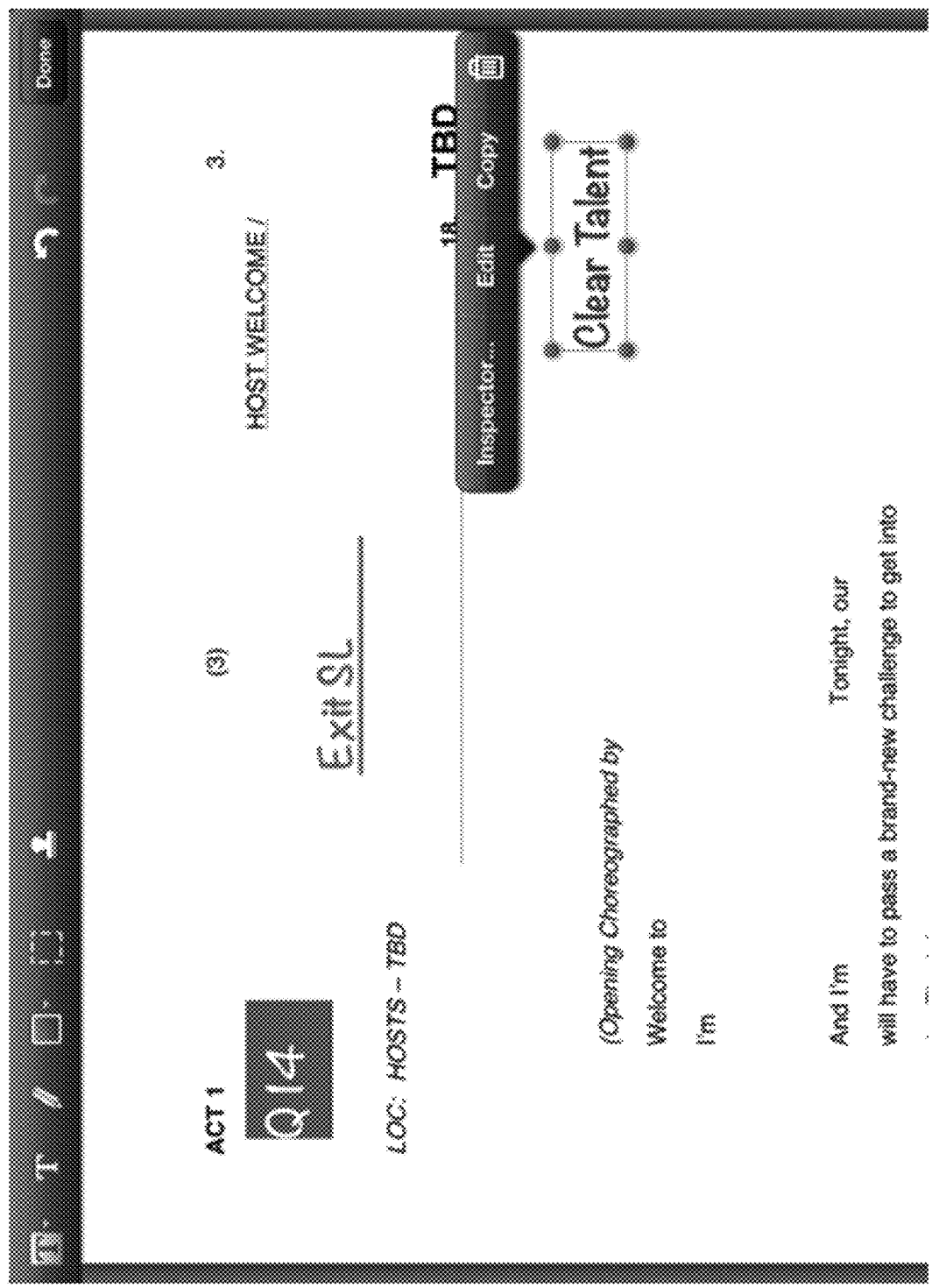
FIG. 5B shows a textbox tool for annotations in accordance with an embodiment of the present disclosure.

The Textbox Button, as shown in FIG. 5B, may be used to type in text that may be displayed and moved around on a page. When creating a textbox, a user may use a physical or virtual keyboard, or any other such input device that allows a user to type in text. In an exemplary embodiment, a virtual keyboard appears along a lower portion of the touchscreen of a computing device and a user types in the desired text. After text is input, the textbox may be clicked on and moved to a desired location on the page. Clicking on the textbox allows a user to customize the style of the text.

The Freeform Drawing tool is used to draw or write on the document similar to a user drawing on a piece of paper with a pen. In some embodiments, a user taps and drags a finger on a touchscreen to mark the document where the finger pushes down. In some embodiments, a user uses a stylus on the surface of a touchscreen, wherein the document is marked where the stylus touches the touchscreen.

Figure 5C:
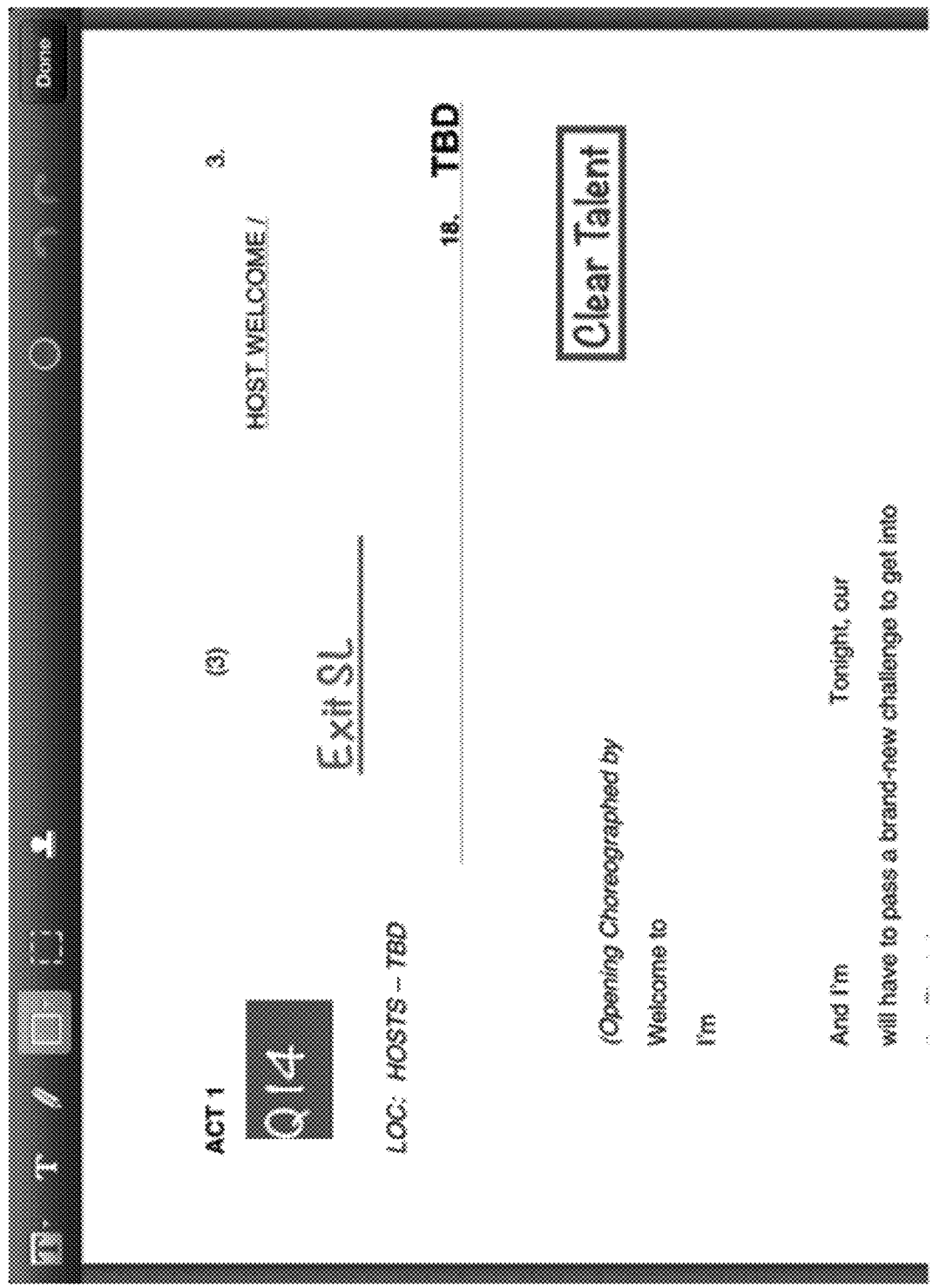
FIG. 5C shows a shape tool for annotations in accordance with an embodiment of the present disclosure.

The Shape Tool, as shown in FIG. 5C, provides a user with various shapes to draw on the document. In some embodiments, as shown in FIG. 5C, a user taps the Shape Tool, selects a type of shape, like a square or circle, and then taps and drags a finger on the surface of the computing device to define the boundaries of the shape.

The Marquee Tool is used to select several annotations at once. In some embodiments, a user may select an annotation by tapping on it. In some embodiments, a user may select an annotation by enclosing it in a marquee box. When several annotations are selected at once, a user may be presented with additional options. For example, a user may be presented with the option to group the annotations. If annotations are grouped, then tapping on one of the annotations selects all of the annotations. When multiple annotations are highlighted, they may be edited at the same time, such as by moving the annotations, changing the style of the annotations, copying the annotations, or deleting the annotations.

Figure 5D:
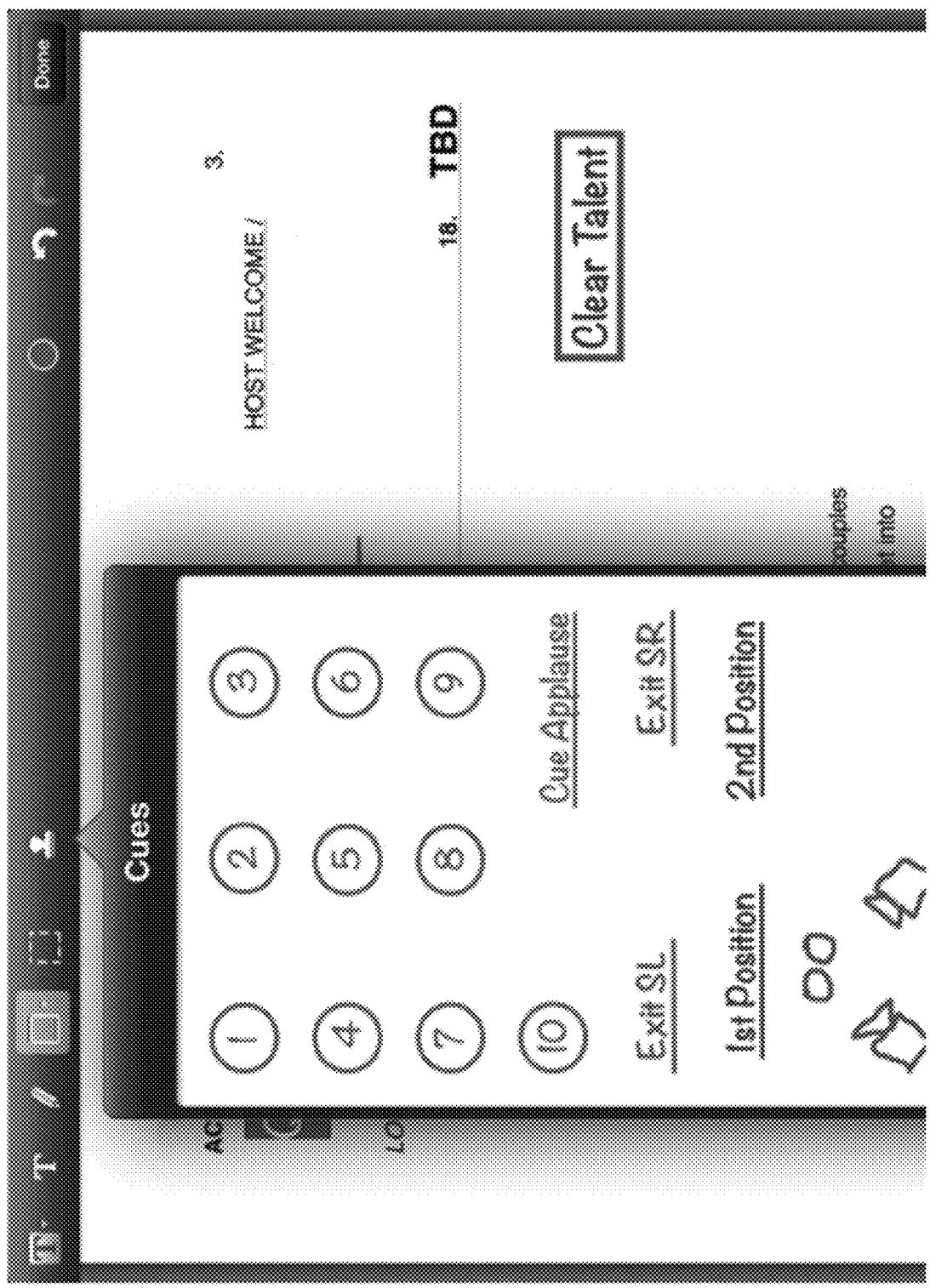
FIG. 5D shows a cue tray for annotations in accordance with an embodiment of the present disclosure.

The Cue Tray, as shown in FIG. 5D, may include several graphics, frequently used annotations, or any other pre-made annotations a user desires. For example, the Cue Tray may include stylized numbers, common stage directions, or stage positions that may be used often in directing actors, as shown in FIG. 5D.

The Undo and Redo buttons allow a user to undo or redo an action that has been taken. For example, a user may freeform draw an annotation on a document, then hit the undo button to remove the freeform annotation. The user may then hit the redo button to return the freeform drawing to the document again.

Additional tools may be available when selecting an annotation. For example, a user may choose to group annotations together, such as a text annotation with a circle annotation circling the text, in order to move the grouped annotations together. In another example, an inspector feature may allow a user to view tags associated with annotations and edit the style of the annotation. These tools are just some ways a user may manipulate a document's note layer using a software application on a computing device.

FIGS. 6A-6F show an embodiment of the process of updating a document to a revised version. In a normal updating process for documents and programs, older files are completely replaced by newer files without a need of any formal review by a user. Users can find out what changes were made by reviewing the patch/update notes or reviewing the new file. However, the process of updating documents in this software application environment is unique, as the note layer of a document containing user created annotations may be preserved when updating a file from one version to the next. This is accomplished by having each document comprise at least two layers. In the example embodiment, each document has two layers, a content layer and a note layer, although more layers may be used.

Figure 6A:
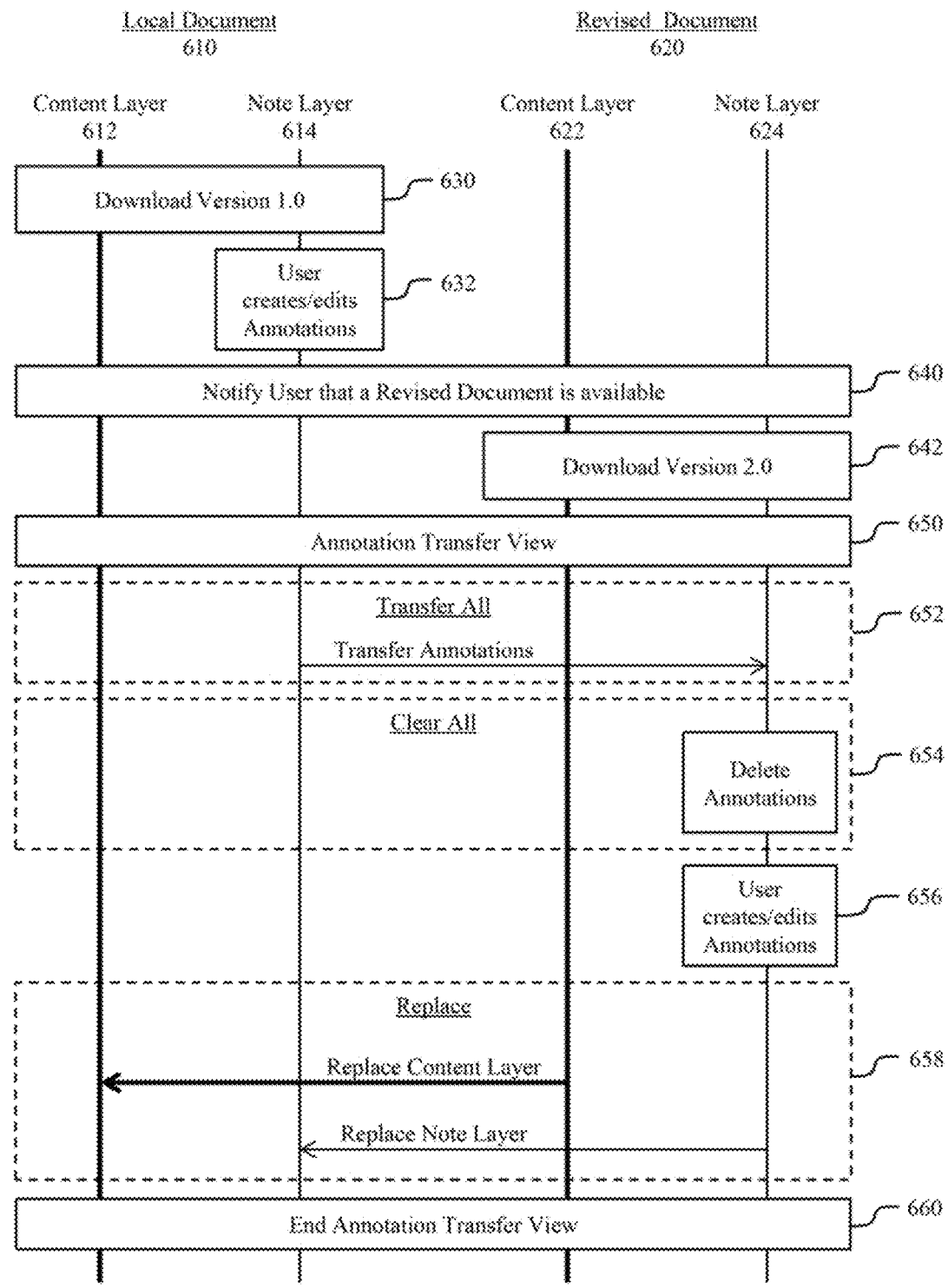
FIG. 6A is a call diagram of the update process of a document in accordance with an embodiment of the present disclosure.

FIG. 6A is a call diagram of one embodiment of the process of updating a document. Typically, a user will download a version of a document from the server and store it as a local document 610. The local document comprises a content layer 612 and a note layer 614. The content layer 612 stores the content of the local document 610, while the note layer stores the annotations of the local document 610. In some embodiments, a note layer 614 starts out blank, wherein the user adds annotations to the note layer 614 over time. In some embodiments, a user uses a software application to download the content layer 612 of a local document 610, and the software application creates a blank note layer 614. In some embodiments, the note layer 614 downloaded from the server has the annotations of others users stored in them. In other embodiments, the annotation layer 614 of a local document 610 is stored on a cloud and can be shared among a plurality of devices. In the example embodiment, in step 630, a user downloads version 1.0 of a document and stores it as a local document 610, although the version may be any version number of the document. Once a local document 610 is stored on the software application, a user may create/edit/delete annotations on the note layer 614 of the local document 610 in step 632.

Figure 6B:
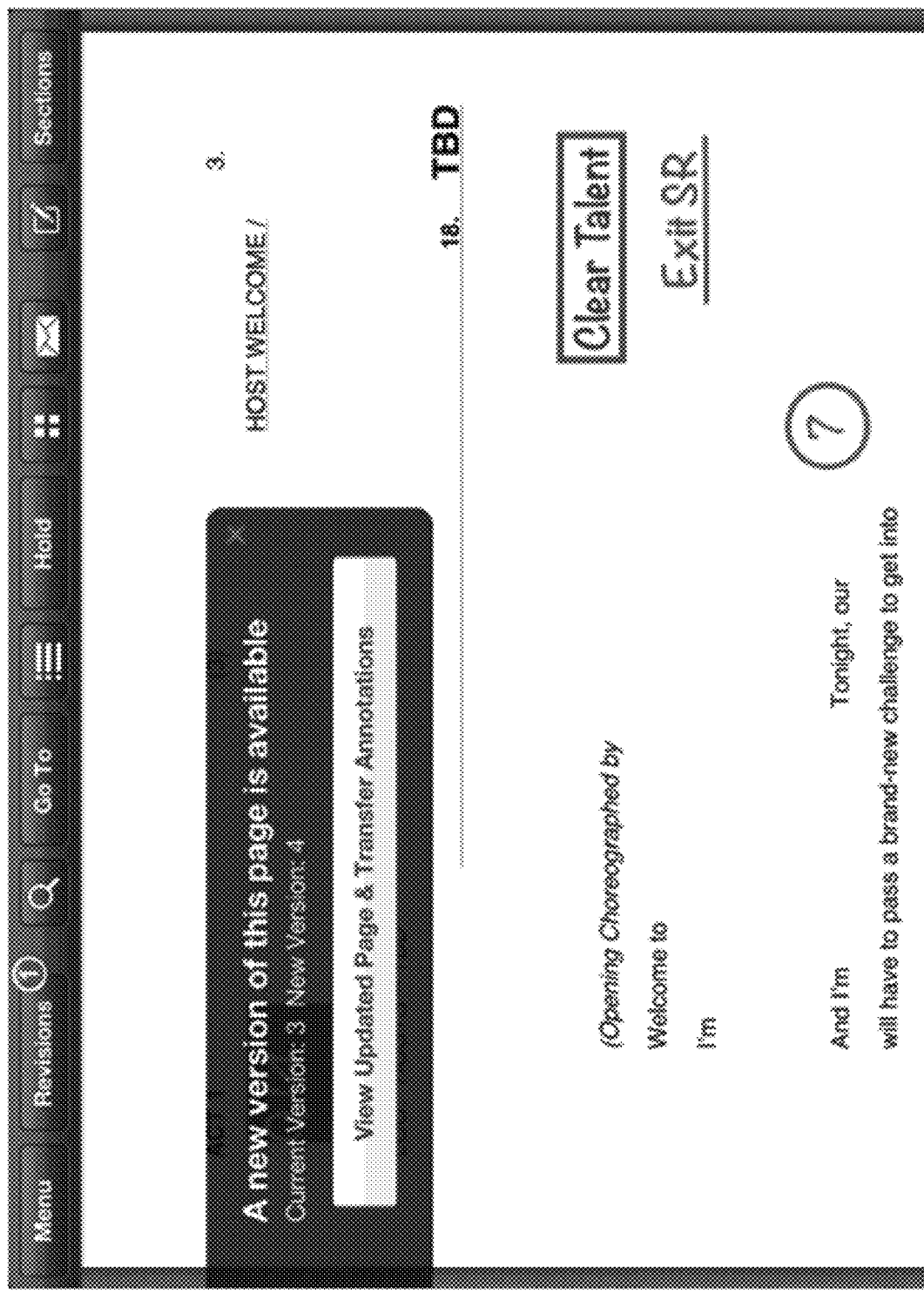
FIG. 6B shows a notification for an update in accordance with an embodiment of the present disclosure.

When an update for a document is available, a user should be notified by the server as shown in step 640 and FIG. 6B. Different notifications may be available depending on which screen a user is on. For example, if an update became available while a user was not in the software application, a notification may pop up as a numbered bubble over the icon to start the software application. A notification could also be displayed on the Project List screen, the Project screen, or a document screen highlighting which Project, document, page, or other information was updated. FIG. 6A shows an embodiment of an update notification when the user is in the midst of viewing a document. In this example, the notification pops up over the document with a button to update the document or page. In addition, the Revision button on the menu bar shows a circled number one icon to notify the user that there is an update/revision. When the user selects the Revision button or the button from the update notification, the user downloads the updated version, as shown in step 642, and is directed to the Annotation Transfer View, as shown in step 650.

The Annotation Transfer View displays two documents side by side, as shown in FIGS. 6C-6F. The Annotation Transfer View is useful in displaying corresponding document pages in order to compare differences and transfer annotations. In the example embodiment in FIG. 6C, a revision document page 626 is displayed on the left and a local document page 616 is displayed on the right. In some embodiments, only the pages of the revised document 620 that are different from the local document 610 are displayed. For example, pages that are different may be grouped in a revision pack and sent to users requiring updates so that the user does not need to download the entire document when updating. In some embodiments, only the pages of the local document 610 with annotations and the corresponding pages of the revised document 620 are displayed. In some embodiments, a user selects what is displayed by selecting the option, such as by selecting a Pages with Annotations Only button. In the example embodiment in FIG. 6C, annotation tools and the grid view is also available to the user. If the user decides not to update the document immediately, the user may go back to viewing the document by pushing the "Go To Document Reader" button.

In embodiments of the Annotation Transfer View, tools are provided to transfer data from note layer to note layer or from content layer to content layer. In the example embodiment in FIG. 6C, the software application provides a Transfer All button, Clear All button, and Replace button. The Transfer All button transfers annotations from the note layer 614 of the local document page 616 to the note layer 624 of the revised document page 626. This is similar to copying notes from one page to another, but easier, faster, and more accurate. The Clear All button deletes all annotations from the note layer 624 of the revised document page 626. This is similar to erasing a page of notes. The Replace button overwrites the local document page 616 content layer 612 and note layer 614 with the revised document 624 page content layer 622 and note layer 624. This is similar to removing a physical page from a binder and collating a new updated page into the binder. In some embodiments, additional types of transfer may be possible. For example, in some embodiments, a first level user may transfer annotations from a note layer to the content layer, and then upload the content layer as a revision pack.

Figure 6C:
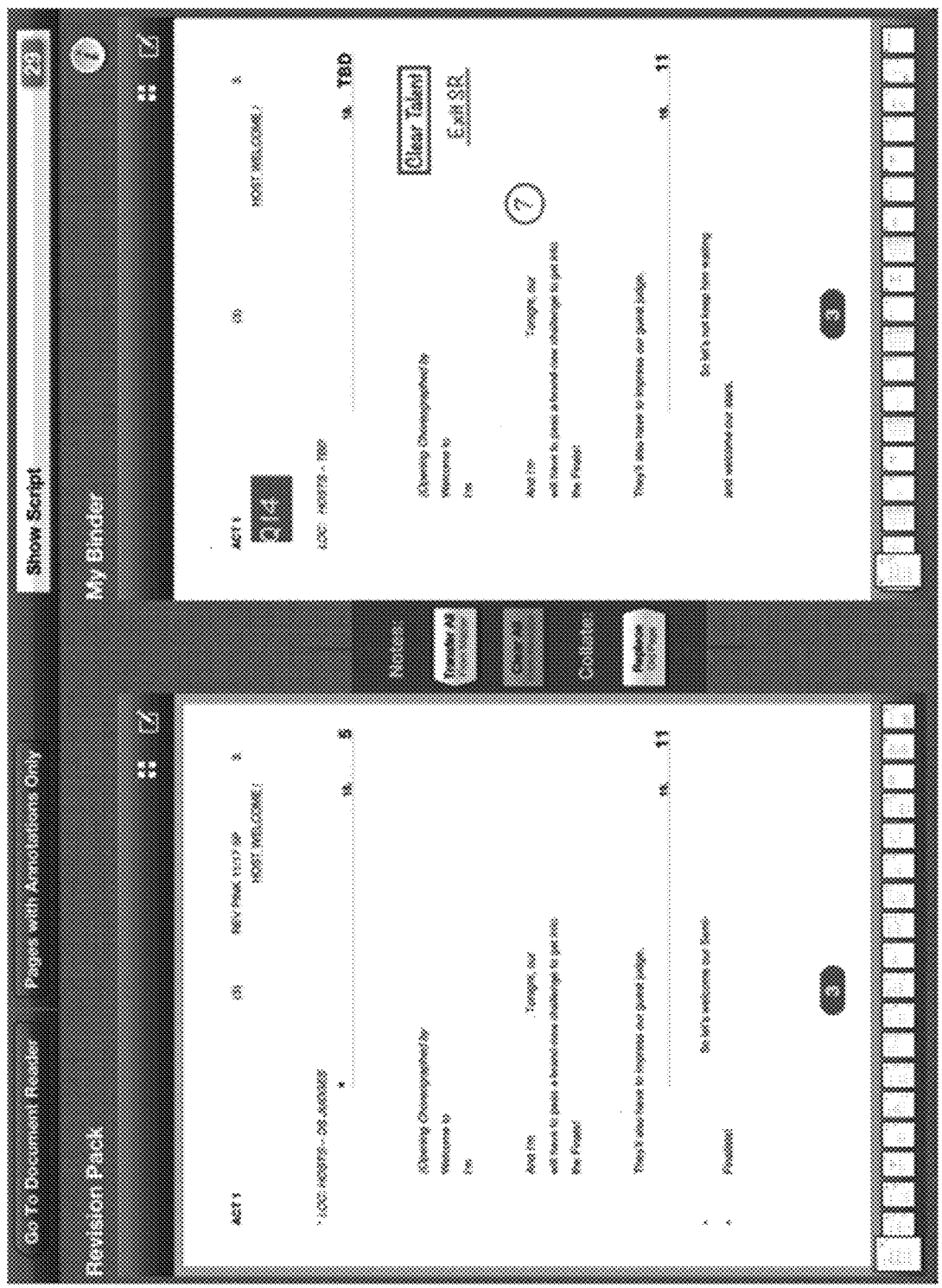
FIG. 6C shows an annotation transfer view of a software application in accordance with an embodiment of the present disclosure.
Figure 6D:
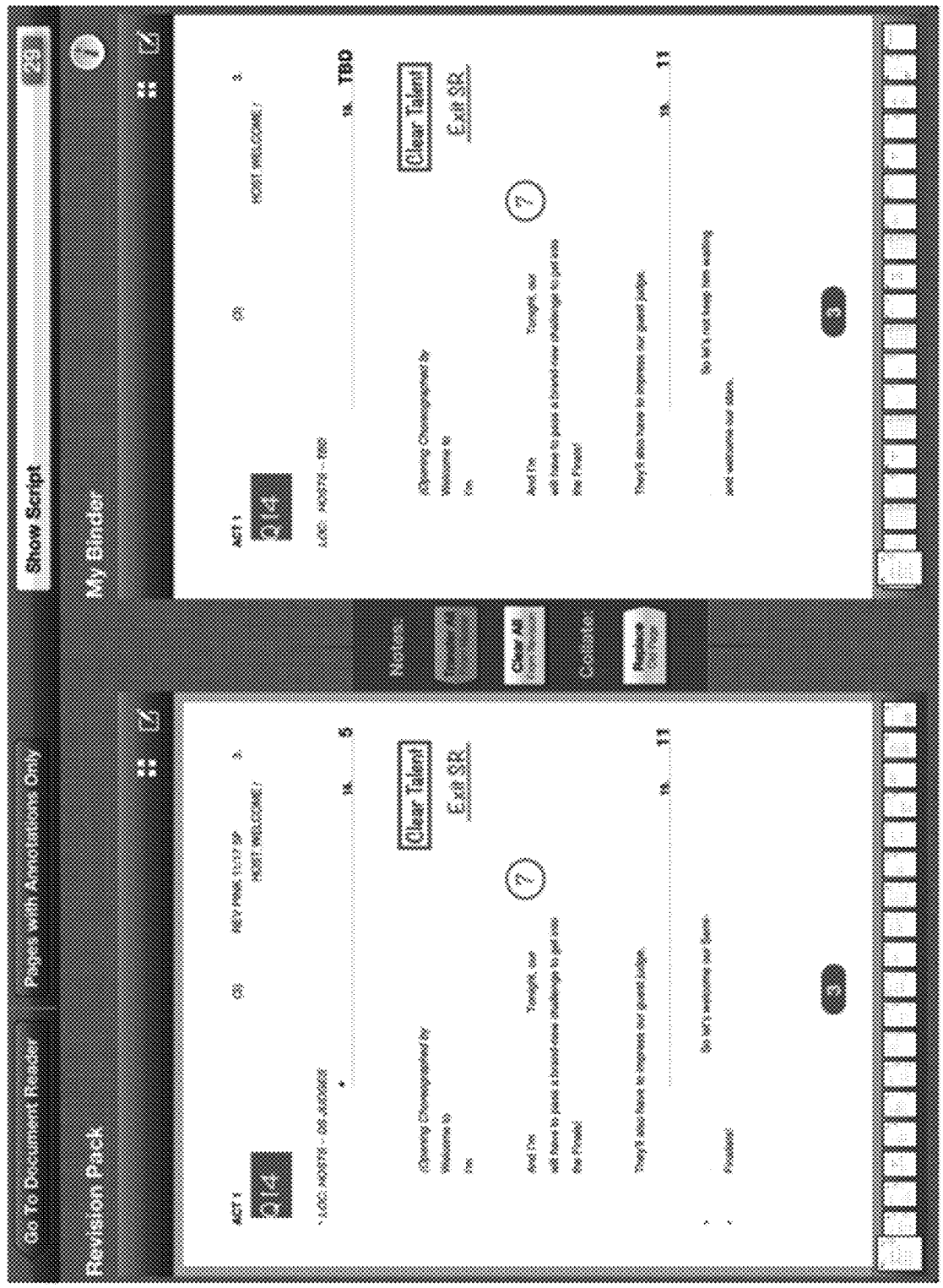
FIG. 6D shows an example of transferring annotations in the annotation transfer view in accordance with an embodiment of the present disclosure.
Figure 6E:
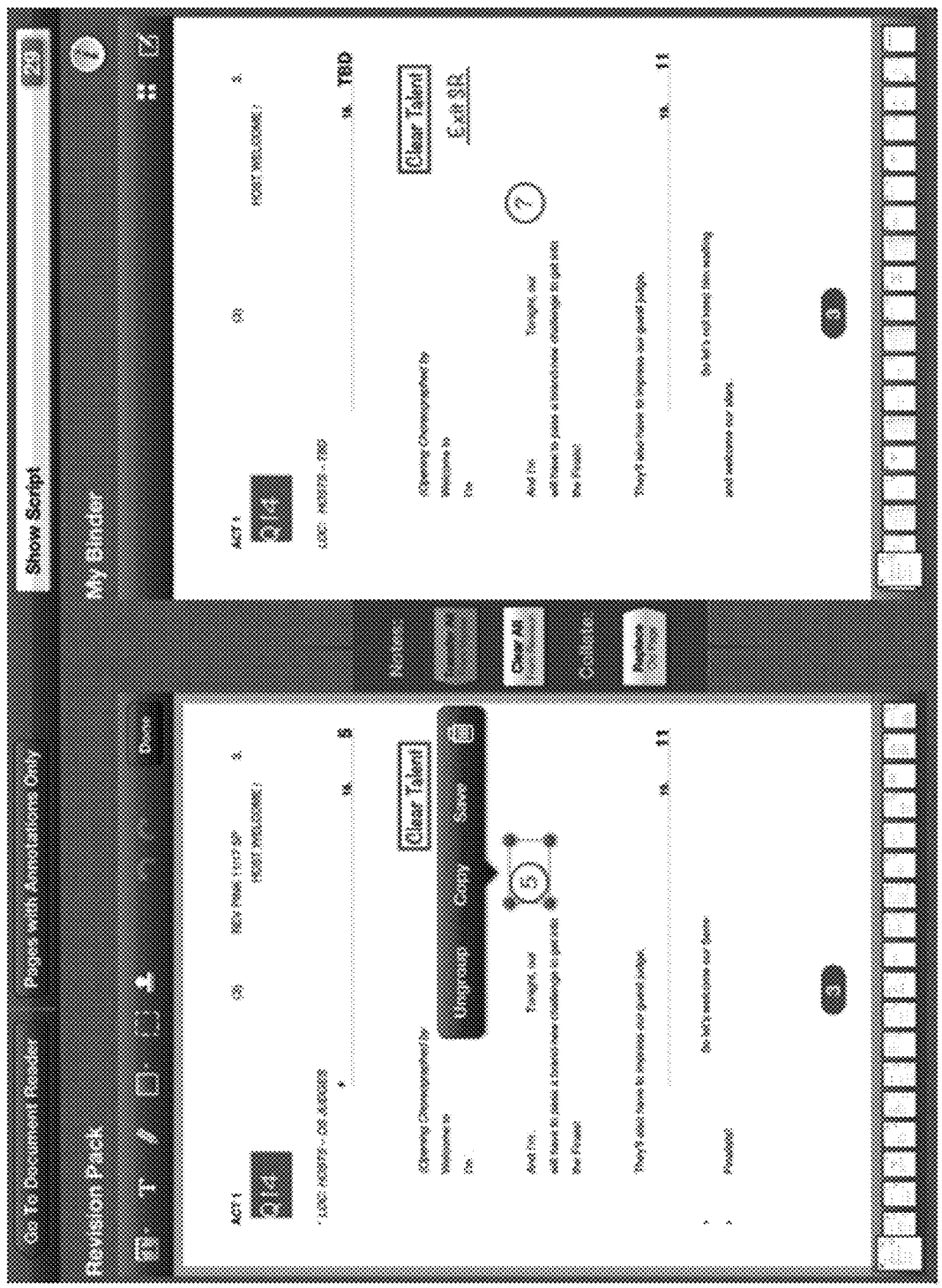
FIG. 6E shows an example of editing annotations in the annotation transfer view in accordance with an embodiment of the present disclosure.
Figure 6F:
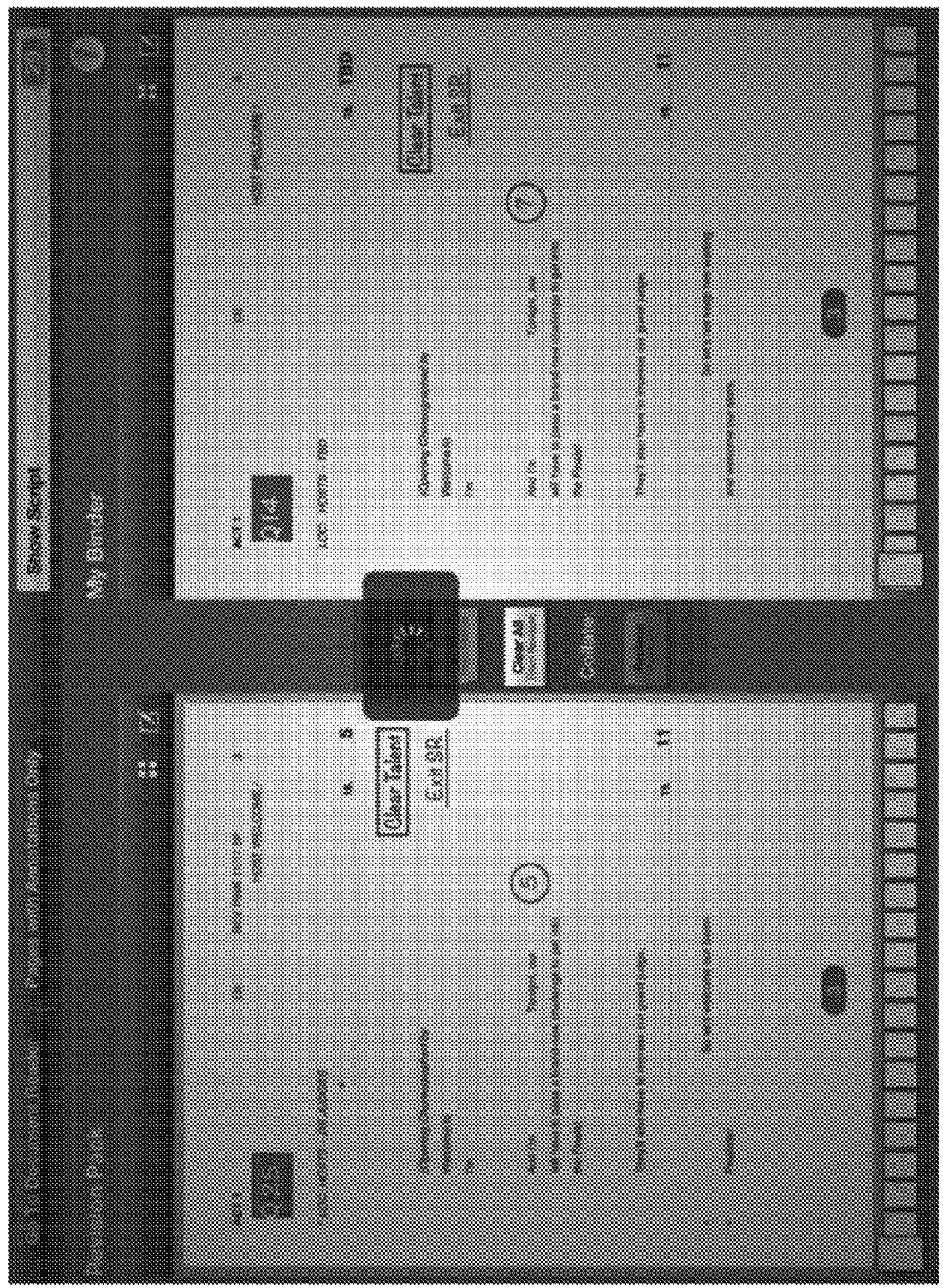
FIG. 6F shows an example of replacing a page in the annotation transfer view in accordance with an embodiment of the present disclosure.

In a typical example of using the Annotation Transfer View, a user starts by viewing the documents side by side in a software application on a computing device, as shown in FIG. 6C. The user pushes the Transfer All Button to transfer annotations from the local document page 616 to the revision document page 626, as shown in FIG. 6D. The user then edits/adds/deletes the annotations, as shown in FIG. 6E. After the user is satisfied with how the revised document page 626 looks, the user presses the Replace Button to collate the new page into the local document 610, replacing the content layer 612 and note layer 614 of the local document page 616 with the content layer 622 and note layer 624 of the revised document page 626, as shown in FIG. 6F. This process is repeated for each page of the local document 610 that is updated. While the illustrated embodiment only displays the tools for transferring, editing and replacing components of the note layer and content layer of a page, other tools may be available. For example, tools for inserting new pages or removing existing pages similar to how a user interacts with a physical three ring binder may be useful to a user organizing and maintaining a document.

Figure 7A:
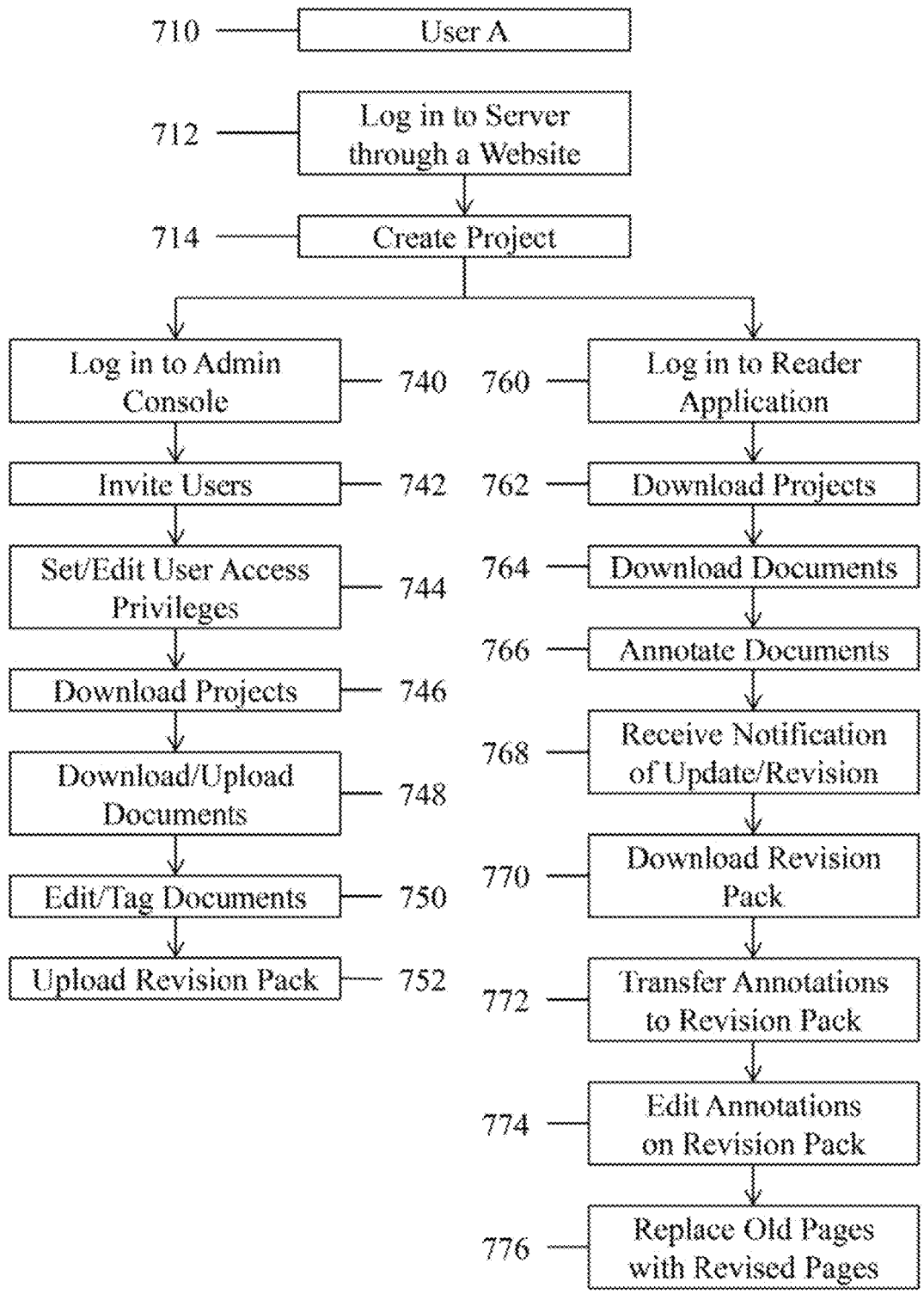
FIG. 7A shows an example administrator creating and managing a project in accordance with an embodiment of the present disclosure.
Figure 7B:
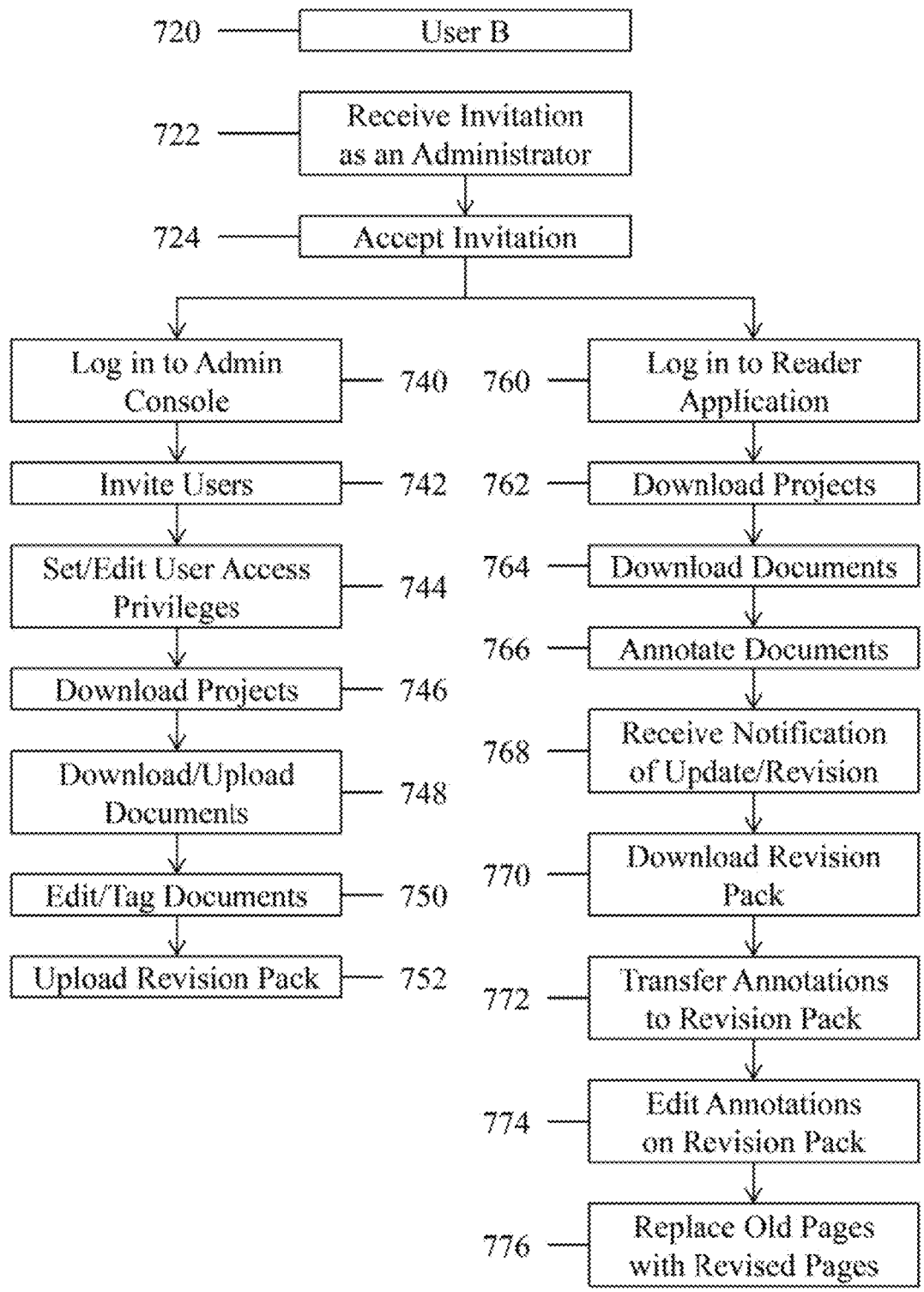
FIG. 7B shows an example administrator being invited to a project and managing the project in accordance with an embodiment of the present disclosure.
Figure 7C:
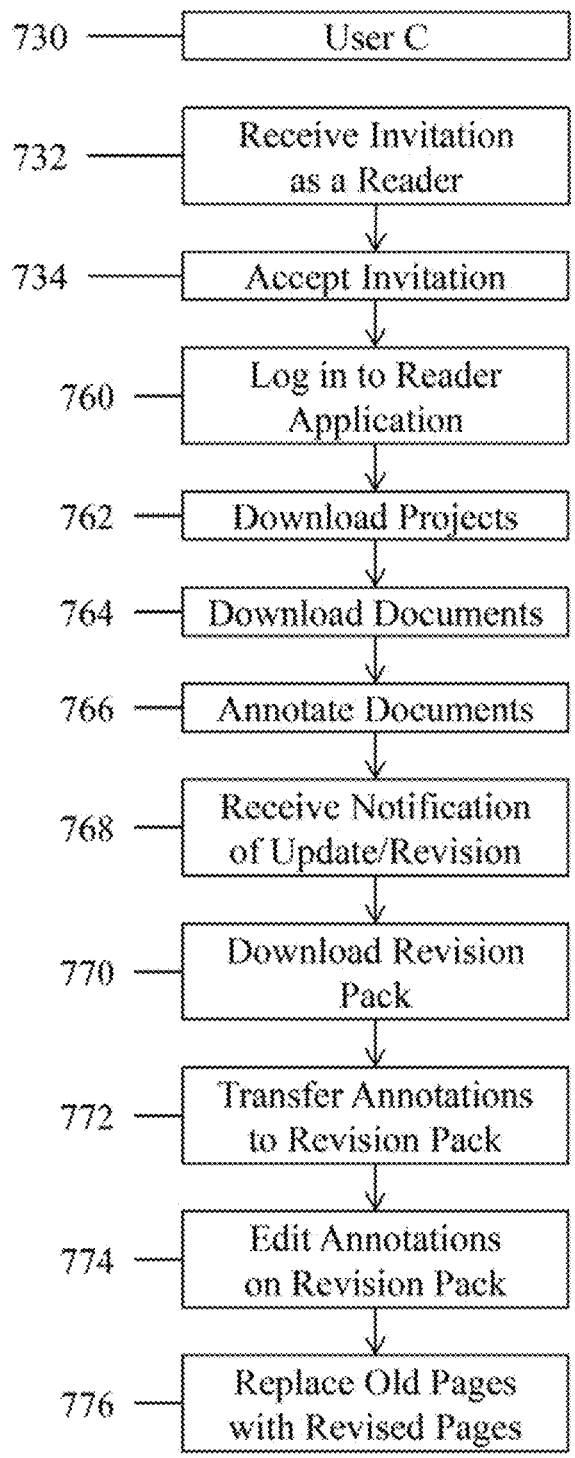
FIG. 7C shows an example reader being invited to a project and accessing the project in accordance with an embodiment of the present disclosure.

FIGS. 7A-7C show method steps of various embodiments of the present invention from the perspectives of users on different devices. The method steps are described herein to illustrate various embodiments from different users in accordance with the present disclosure, and are not meant to be exhaustive or limiting.

User A, shown in FIG. 7A, is an example first level user who creates a project. User A accesses a website through a browser on a computer and logs in to the server at step 712. Once inside the website, the user creates a project in step 714. In this example, the user provides payment information for the project to be active for a set time period. Once the project is initiated, User A uses software applications designed to access and view project files.

One embodiment of a software application to access and view project files is an Admin Console, designed for Administrators to download, edit, and upload project documents and manage user access privileges. An Administrator will log in to such a software application in step 740 to authenticate user access privileges to various projects. Managing user access privileges is an important step in sharing the project with various users. User A may invite users such as User B and User C to the project in step 742, and edit their access privileges in step 744. In some embodiments, the invitation indicates the access privileges the user will receive when the invitation is accepted. Another important feature in this software application is the ability to manage documents. An Administrator will initially upload documents to be stored on a server in step 748. Other users using their devices will download those documents and view them on their devices. Meanwhile, the Administrator may choose to edit the documents in step 750. Those revisions may be uploaded to the server and pushed to the other users of the project in step 752. This is a continual process of updating dependent on what the Administrator decides until the project is de-activated.

Another embodiment of a software application designed to access and view project files is a Reader Application. The Reader Application is designed to be used by all users to download and display project documents, and provides tools for the user to annotate each document without changing the content layers of the documents. For example, this application may take the form of a tablet computer application to save documents from a server and view them on the display. A user will log in to the Reader Application in step 760 to authenticate the user access privileges to various projects. Projects available to the user will be displayed in the application, and the user may elect to download the projects and associated documents in steps 762, 764. The user annotates the documents in step 766, making notes on a note layer of the document in order not to alter the content layer of the document, allowing easier transfer of annotations between versions of documents. When an updated version is detected from the Reader Application in step 768, the user may download a revision pack to update the document to the newest version. This allows a user to compare the previously downloaded document with the revision pack side by side in the Annotation Transfer View. The user transfer the annotations to the revision pack in step 772, edits the annotations on the revision pack in step 774, and then replaces pages of the old document with the revised pages of the revision pack.

User B, shown in FIG. 7B, is an example Administrator who is invited to the project. User B differs from User A in that User B did not create the project by accessing the website. However, after User B receives the invitation in step 722 and accepts the invitation in step 724, User B has the same access privileges to the project as User A, including accessing the various embodiments of software applications to access, view, and edit projects.

User C, shown in FIG. 7C, is an example Reader who is invited to the project. User B differs from User C in this instance in that User B is an Administrator with access to both the Admin Console and the Reader Application. User C, on the other hand, only has access to the Reader Application.

In various embodiments, the method steps described herein, including the method steps described in FIGS. 7A-7C, may be performed in an order different from the particular order described or shown. In other embodiments, other steps may be provided, or steps may be eliminated, from the described methods.

Systems, apparatus, and methods described herein may be implemented using digital circuitry, or using one or more computers using well known computer processors, memory units, storage devices, computer software, and other components. Typically, a computer includes a processor for executing instructions and one or more memories for storing instructions and data. A computer may also include, or be coupled to, one or more storage devices, such as one or more magnetic disks, internal hard disks and removable disks, optical disks, etc.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the a server may transmit a request adapted to cause a client computer to perform one or more of the method steps described herein, including one or more of the steps of FIGS. 7A-7C. Certain steps of the methods described herein, including one or more of the steps of FIGS. 7A-7C, may be performed by a server or by another processor in a network-based cloud-computing system. Certain steps of the methods described herein, including one or more of the steps of FIGS. 7A-7C, may be performed by a client computer in a network-based cloud computing system. The steps of the methods described herein, including one or more of the steps of FIGS. 7A-7C, may be performed by a server and/or by a client computer in a network-based cloud computing system, in any combination.

Figure 8:
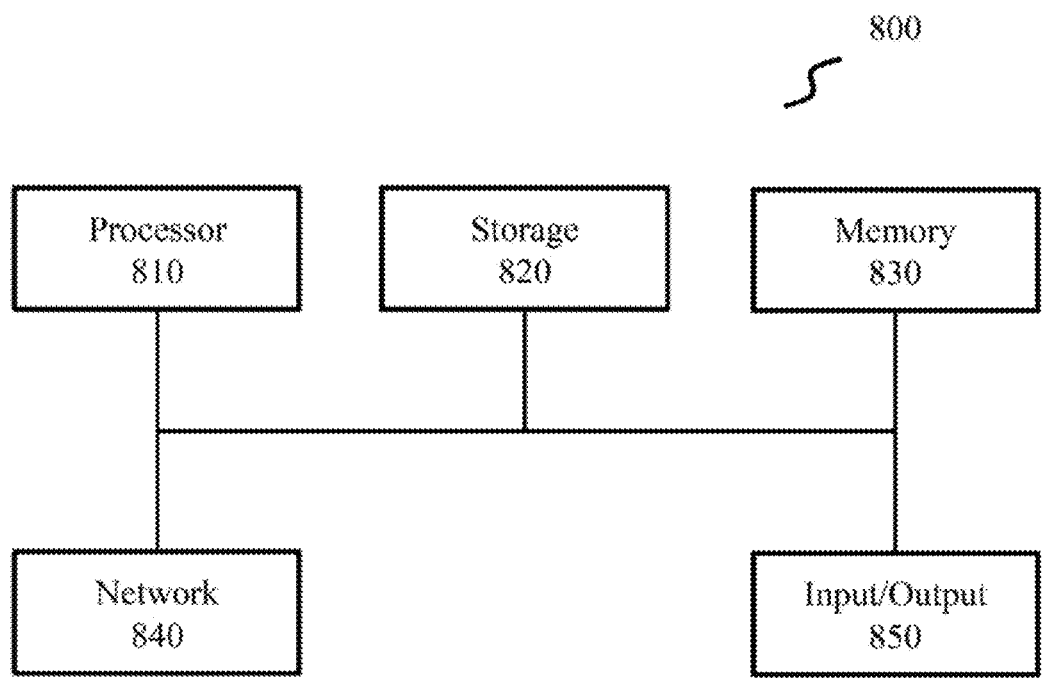
FIG. 8 shows a high-level diagram of a computer that may be used to implement various aspects of the present disclosure in certain embodiments.

A high-level block diagram of an exemplary computer 800 that may be used to implement systems, apparatus, and methods described herein is illustrated in FIG. 8. The computer 800 comprises a processor 810 operatively coupled to a data storage device and memory. Processor 810 controls the overall operation of computer 800 by executing computer program instructions that define such operations. The computer program instructions may be stored in data storage device 820, or other non-transitory computer readable medium, and loaded into memory 830 when execution of the computer program instructions is desired. Thus, the method steps of FIGS. 7A-7C can be defined by the computer program instructions stored in memory 830 and/or data storage device 820 and controlled by processor 810 executing the computer program instructions.

For example, the computer program instructions can be implemented as computer executable code programmed by one skilled in the art to perform an algorithm defined by the method steps in FIGS. 7A-7C. Computer 800 also includes one or more network interfaces 840 for communicating with other devices via a network. Computer 800 also includes one or more input/output devices 850 that enable user interaction with computer 800 (e.g., display, keyboard, touchpad, mouse, speakers, buttons, etc.).

Processor 810 can include, among others, special purpose processors with software instructions incorporated in the processor design and general purpose processors with instructions in storage device 820 or memory 830, to control the processor 810, and may be the sole processor or one of multiple processors of computer 800. Processor 810 may be a self-contained computing system, containing multiple cores or processors, a bus, memory controller, cache, etc. A multi-core processor may be symmetric or asymmetric. Processor 810, data storage device 820, and/or memory 830 may include, be supplemented by, or incorporated in, one or more application-specific integrated circuits (ASICs) and/or one or more field programmable gate arrays (FPGAs). It can be appreciated that the disclosure may operate on a computer 800 with one or more processors 810 or on a group or cluster of computers networked together to provide greater processing capability.

Data storage device 820 and memory 830 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Network interface 840 enables the computer 800 to communicate with other devices via a network using any suitable communications protocol. By way of example, and not limitation, such suitable communications protocols can include Ethernet, Token Ring, Wi-Fi (e.g., IEEE 802.11), Wi-MAX (e.g., IEEE 802.16), Bluetooth®, near field communications ("NFC"), radio frequency systems, infrared, GSM, GSM plus EDGE, CDMA, quad-band, other cellular protocols, VOIP, or any other suitable communications protocols. By way of example, and not limitation, the network interface 840 enables the computer 800 to transfer data, synchronize information, update software, or any other suitable operation.

Input/output devices 850 may include peripherals, such as a printer, scanner, monitor, etc. Input/output devices 850 may also include parts of a computing device, such as a smartphone having a touchscreen, speakers, and buttons. For example, input/output devices 850 may include a display device such as a liquid crystal display (LCD) monitor for displaying information to the user, a keyboard and mouse by which the user can provide input to the computer 800, or a touchscreen for both input and output.

Any or all of the systems and apparatus discussed herein, including personal computers, tablet computers, hand-held devices, cellular telephones, servers, database, cloud-computing environments, and components thereof, may be implemented using a computer such as computer 800.

One skilled in the art will recognize that an implementation of an actual computer or computer system may have other structures and may contain other components as well, and that FIG. 8 is a high level representation of some of the components of such a computer for illustrative purposes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for retaining a second layer of information of a document while replacing a first layer of information of the document, comprising:
   at a computing device having a display:
   a. displaying a first page of a first document and a second page of a second document side by side on the display of the computing device, wherein each page comprises a first layer and a second layer;
   b. copying all data from the second layer of the first page to the second layer of the second page;
   c. editing the second layer of the second page; and
   d. replacing the first and second layers of the first page with the first and second layers of the second page.

2. The method of claim 1, wherein the first layer is a content layer, wherein the second layer is a note layer, and wherein the note layer holds annotations created by a user of the computing device.

3. The method of claim 2, wherein the second document is an updated version of the first document, wherein the content layer of the second document is different from the content layer of the first document.

4. The method of claim 3, wherein the documents are stored on a server, wherein the method further comprises:
   e. downloading the first document to the computing device from the server;
   f. displaying the first document on the display of the computing device;
   g. annotating the first document on the computing device;
   h. detecting the second document on the server; and
   i. downloading the second document to the computing device from the server.

5. The method of claim 4, further comprising filtering out pages of the first document and second document that have identical content layers during the step of displaying a first page of a first document and a second page of a second document side by side.

6. The method of claim 5, further comprising displaying a project containing documents to users having first level or second level access privileges to the project, and providing tools to edit the content layers of the documents of the project to users having first level access privileges to the project.

7. The method of claim 2, wherein each page further comprises at least one additional layer, wherein the at least one additional layer is a note layer, wherein the second layer is annotated by a first user on a first computing device, and wherein the at least one additional layer is annotated from a second user on a second computing device different from the first user of the first computing device.

8. A non-transitory computer readable storage medium having stored therein instructions, which when executed by a computing device, cause the computing device to:
   a. display a first page of a first document and a second page of a second document side by side on a display of the computing device, wherein each page comprises a first layer and a second layer;
   b. copy all data from the second layer of the first page to the second layer of the second page;
   c. edit the second layer of the second page; and
   d. replace the first and second layers of the first page with the first and second layers of the second page.

9. The non-transitory computer readable storage medium of claim 8, wherein the first layer is a content layer, wherein the second layer is a note layer, and wherein the note layer holds annotations created by a user of the computing device.

10. The non-transitory computer readable medium of claim 9, wherein the second document is an updated version of the first document, wherein the content layer of the second document is different from the content layer of the first document.

11. The non-transitory computer readable medium of claim 10, wherein the documents are stored on a server, wherein the storage medium further comprises instructions to:
   e. download the first document to the computing device from the server;
   f. display the first document on the display of the computing device;
   g. annotate the first document on the computing device;
   h. detect the second document on the server; and
   i. download the second document to the computing device from the server.

12. The non-transitory computer readable medium of claim 11, further comprising instructions to filter out pages of the first document and second document that have identical content layers while displaying the first page of the first document and the second page of the second document side by side.

13. The non-transitory computer readable medium of claim 12, further comprising instructions to display a project containing documents to users having first level or second level access privileges to the project, and providing tools to edit the content layer of a document of the project to users having first level access privileges to the project.

14. The non-transitory computer readable medium of claim 9, wherein each page further comprises at least one additional layer, wherein the at least one additional layer is a note layer, wherein the second layer is annotated by a first user on a first computing device, and wherein the at least one additional layer is annotated from a second user on a second computing device different from the first user of the first computing device.

15. A computing device, comprising:
   one or more processors;
   memory; and
   one or more programs, wherein the one or more programs are stored in the memory and configured to be executed by the one or more processors, the one or more programs including instructions to:
   a. display a first page of a first document and a second page of a second document side by side on a display of the computing device, wherein each page comprises a first layer and a second layer;
   b. copy all data from the second layer of the first page to the second layer of the second page;
   c. edit the second layer of the second page; and
   d. replace the first and second layers of the first page with the first and second layers of the second page.

16. The computing device of claim 15, wherein the first layer is a content layer, wherein the second layer is a note layer, and wherein the note layer holds annotations created by a user of the computing device.

17. The computing device of claim 16, wherein the second document is an updated version of the first document, wherein the content layer of the second document is different from the content layer of the first document.

18. The computing device of claim 17, wherein the documents are stored on a server, wherein the one or more programs further comprise instructions to:
   e. download the first document to the computing device from the server;
   f. display the first document on the display of the computing device;
   g. annotate the first document on the computing device;
   h. detect the second document on the server; and
   i. download the second document to the computing device from the server.

19. The computing device of claim 18, wherein the one or more programs further comprise instructions to filter out pages of the first document and second document that have identical content layers, wherein the one or more programs further comprise instructions to filter out pages with no annotations in the note layer of the first document.

20. The computing device of claim 16, wherein each page further comprises at least one additional layer, wherein the at least one additional layer is a note layer, wherein the second layer is annotated by a first user on a first computing device, and wherein the at least one additional layer is annotated from a second user on a second computing device different from the first user of the first computing device.

* * * * *